United States Patent [19]
Assouad et al.

[11] Patent Number: 5,826,093
[45] Date of Patent: Oct. 20, 1998

[54] DUAL FUNCTION DISK DRIVE INTEGRATED CIRCUIT FOR MASTER MODE AND SLAVE MODE OPERATIONS

[75] Inventors: Nicolas C. Assouad; David L. Dyer, both of Boulder; Thomas G. Adams, Longmont, all of Colo.

[73] Assignee: Adaptec, Inc., Milpitas, Calif.

[21] Appl. No.: 363,448

[22] Filed: Dec. 22, 1994

[51] Int. Cl.$^6$ .................................................. G06F 15/00
[52] U.S. Cl. ............................ 395/800; 395/834; 395/894
[58] Field of Search .................................. 395/800, 250, 395/894, 834

[56] References Cited

U.S. PATENT DOCUMENTS

| | | | |
|---|---|---|---|
| 4,086,659 | 4/1978 | Cizmic et al. | 366/73.03 |
| 4,490,784 | 12/1984 | Ives et al. | 395/250 |
| 5,062,044 | 10/1991 | Asami et al. | 395/290 |
| 5,150,465 | 9/1992 | Bush et al. | 395/834 |
| 5,450,546 | 9/1995 | Krakirian | 395/250 |
| 5,455,954 | 10/1995 | Packer | 395/894 |
| 5,469,398 | 11/1995 | Scott et al. | 365/221 |

FOREIGN PATENT DOCUMENTS

| | | | |
|---|---|---|---|
| 0306962 | 3/1989 | European Pat. Off. | G06F 15/16 |
| 0364743 | 4/1990 | European Pat. Off. | G06F 15/78 |

OTHER PUBLICATIONS

"Adaptee Shows Integrated DSP/Disk Drive Devices," Electronic News, Sep. 19, 1994, p. 70.

Primary Examiner—Alyssa H. Bowler
Assistant Examiner—John Follansbee
Attorney, Agent, or Firm—Skjerven, Morrill, MacPherson, Franklin & Friel LLP; Forrest E. Gunnison

[57] ABSTRACT

A single integrated circuit includes an on-board processor, a peripheral port, and a general purpose input/output (I/O) circuit that support both master mode and slave mode operations. In a master mode of operation, the integrated circuit functions as a disk drive microcontroller and seamlessly interfaces with a hard disk controller. The integrated circuit includes programmable circuitry for generating individual chip select signals for external random access memory (RAM) and external read-only memory (ROM); a fully programmable general purpose input/output interface; and a programmable bi-directional peripheral port. Each of these features are utilized in the master mode to control operation of the disk drive. In a slave mode of operation, the integrated circuit provides full motion control of the spin and tracking systems of a disk drive. In slave mode, the peripheral port is an interface to a host microcontroller or a host RISC processor, that is typically contained within the disk drive. The host microcontroller communicates with the integrated circuit through a set of mailbox registers within the peripheral port to configure the integrated circuit for full motion control and to receive information from the integrated circuit.

36 Claims, 14 Drawing Sheets

DUAL FUNCTION DISK DRIVE INTEGRATED CIRCUIT FOR MASTER MODE AND SLAVE MODE OPERATIONS

BACKGROUND OF THE INVENTION

1. Field of the Invention

The present invention is related generally to integrated circuits used in hard disk drives for spin and tracking systems and in particular to an integrated circuit that in a master mode functions as a disk drive microcontroller and in a slave mode responds to commands from a host microcontroller and provides full motion control of the disk drive spin and tracking systems.

2. Description of Related Art

As the form factor of hard disk drives become smaller and as the level of integration for all disk drives becomes greater, the number of functions performed by a single integrated circuit in a disk drive increases substantially. As the number of functions performed by an integrated circuit increases, i.e., as the integration level increases, many of the functions performed require information from external circuits or provide information to external circuits.

However, the integrated circuit package size limits the number of available pins. The limited number of pins makes it unfeasible to route signals for each function to a pin or pins of the integrated circuit. Consequently, the number of functions that can be performed by a highly integrated circuit becomes problematic because there are not sufficient package pins for the necessary communications. Therefore, each integrated circuit is typically optimized for a particular application and the integrated circuit is suitable only for use in that application. Typically, in a disk drive, the microcontroller is a first integrated circuit and sequencers used in tracking are a separate integrated circuit.

In the area of disk drive controllers, integration is becoming increasingly greater. Disk drive controller circuits that previously occupied a plug-in board are now packaged in a single integrated circuit. In addition, as the disk drive capacity and performance has increased, functions once performed by the disk drive microcontroller have been incorporated in hardware. Typically, for example, in embedded servo disk drives using embedded servo fields, a dedicated servo burst sequencer has been incorporated in an integrated circuit. The disk drive microcontroller typically initializes the dedicated servo burst sequencer and the servo burst sequencer generates timing signals that are used by the disk drive microcontroller and other circuit in the disk drive.

While disk drive performance has increased, the development and manufacture of a separate integrated circuit for use with a microcontroller is not cost effective for low end disk drives. Typically, in low end disk drives, a microcontroller is used to perform most disk drive functions. Nevertheless, in high performance disk drives, offloading functions from the microcontroller to other hardware is desirable. Thus, if a manufacturer has both low end and high end disk drives, the manufacturer currently must develop or purchase different components for the high end and low end disk drives.

SUMMARY OF THE INVENTION

In accordance with the principles of this invention, a single integrated circuit includes an on-board processor, a peripheral port, and a general purpose input/output (I/O) circuit that support both master mode and slave mode operations. In a master mode of operation, the integrated circuit of this invention functions as a disk drive microcontroller and seamlessly interfaces with a hard disk controller. The integrated circuit includes programmable circuitry for generating individual chip select signals for external random access memory (RAM) and external read-only memory (ROM); a fully programmable general purpose input/output interface; and a programmable bi-directional peripheral port. Each of these features are utilized in the master mode to control operation of the disk drive.

In a slave mode of operation, the integrated circuit provides full motion control of the spin and tracking systems of a disk drive. In slave mode, the peripheral port is an interface to a host microcontroller or a host RISC processor, that is typically contained within the disk drive. The host microcontroller communicates with the integrated circuit of this invention through a set of mailbox registers within the peripheral port to configure the integrated circuit for full motion control and to receive information from the integrated circuit.

In one embodiment, the on-board processor is connected to a memory controller by a processor program bus that includes address and data busses and a processor data bus that also includes address and data busses. The memory controller drives and receives information on a common external memory bus that couples the memory controller to an I/O buffer circuit. The I/O buffer circuit in turn drives and receives information on an external common memory bus that is connected to pins of the integrated circuit. The memory controller also drives and receives information on a common internal memory bus.

The external common memory bus can accommodate a plurality of memories. In one embodiment, four different external memories are utilized. The memory controller generates an individual chip select signal for each of the four external memories as well as chip select signals for each of the internal memories. In this embodiment, a program/data ROM with an external ROM chip select line, a program/data RAM with an external RAM chip select line, a memory in a hard disk controller (HDC) with an external HDC chip select line, and an user application memory with an external user application chip select line are on the external common memory bus.

The internal common memory bus interfaces the memory controller with the peripherals for the processor within the integrated circuit. Specifically, memory mapped I/O registers in the peripheral port and the general purpose I/O circuit are on the internal common memory data bus.

The memory controller resolves the processor program bus and the processor data bus contentions for the common external memory bus. In addition to the individual chip select signals for each of the external memories, the memory controller also generates the chip select signals for each of the memory mapped I/O registers, and a programmable number of wait states for each of the external memories. The memory controller supports both 8-bit and 16-bit external data bus widths for the external common memory bus, and supports programming of an external ROM for master mode operations when the external ROM is, for example, any one of an electrically programmable ROM, an electrically erasable and programmable ROM (EEPROM), and a flash EEPROM.

The peripheral port of this invention includes programmable master and slave functionality. The peripheral port is configured by the on-board processor for the master mode operation when the integrated circuit is utilized, for example, as a disk drive microcontroller. In the master mode, information can be transmitted or received through the peripheral port from other integrated circuits that interface with the on-board processor such as a read/write combination integrated circuit and a voice coil motor(VCM)/spin combination integrated circuit. Conversely, the peripheral port can be configured as a slave and information can either be downloaded from the host microcontroller through the peripheral port to other circuits in the integrated circuit, or uploaded from the integrated circuit to the host microcontroller through the peripheral port.

In one embodiment, the peripheral port includes a serial port. When the peripheral port is configured in master mode, the serial port serves as a bi-directional synchronous serial port for communication with external integrated circuits that support disk drive operations. To support the variety of serial interfaces used by various vendors of integrated circuits that support disk drive operations, the peripheral port is fully programmable. In this embodiment, a user can program the length of both the command and data portions of a transfer, the polarity of signals on the clock and enable lines of the serial port, and the shift direction of the data. Following the completion of the transfer over the serial port, a flag is raised which the on-board processor can detect either by polling a bit or through an interrupt.

When the peripheral port is configured in slave mode, the peripheral port serves as an interface to a disk drive host microcontroller. In the slave mode, the serial port is used to transmit packets of data, e.g., either two or three byte packets, between the host microcontroller and the integrated circuit of this invention. The first byte transferred is a control packet, sometimes called a control byte, that contains read/write and addressing information. The second byte and the third byte, assuming the third byte is utilized, are either a command, write-data sourced from the host microcontroller, or read-data sourced from the integrated circuit. The host microcontroller communicates with the on-board processor through a set of mailbox registers. When the host microcontroller writes to a command register in the set of mailbox registers, a flag is raised which the on-board processor can detect either by polling a bit or through an interrupt.

In this embodiment, the memory mapped I/O registers in the peripheral port sit on the common internal memory bus. Consequently, any information available to the on-board processor can be supplied to the peripheral port and any data provided to the peripheral port are available to the on-board processor. Therefore, the on-board processor can be utilized in both the master and slave modes of the peripheral port.

A general purpose I/O circuit controls the functions of a plurality of general purpose I/O pins of the integrated circuit of this invention. The general purpose I/O circuit has the capability to sense (input) and control (output) external disk drive logic elements, such as a read/write head selection logic circuit, by receiving digital signals and driving digital signals, respectively, on the plurality of general purpose I/O pins. In one embodiment, bits in a register are used to control the function of each pin in the plurality of general I/O pins. The particular configuration of the bits in the register, and thus the operation of general purpose I/O circuit, is determined by the disk drive designer.

Thus, the disk drive integrated circuit of this invention includes a processor program bus, a processor data bus, a common external memory bus, and an internal common memory bus. A memory controller is coupled to the processor program bus, the processor data bus, the common external memory bus, and the internal common memory bus. A peripheral port is coupled to the memory controller by the internal common memory bus. The peripheral port includes a master mode circuit and a slave mode circuit. The disk drive integrated circuit also includes a general purpose input output circuit.

The memory controller drives a plurality of external chip select lines and includes an address decoder circuit connected to a program address bus in the processor program bus, to a data address bus in the processor data bus, and to the plurality of external chip select lines. The program address bus and the data address bus provide input signals to the address decoder circuit and the address decoder circuit selectively generates output signals on the plurality of external chip select lines.

The memory controller also includes a multiplexer circuit connected to the program address bus, to the data address bus, and to a common external memory address bus of the common external memory address bus. The multiplexer circuit has an input line connected to the address decoder circuit. When a signal on the input line has a first state, the multiplexer circuit passes information on the program address bus therethrough to the common external memory address bus. When the signal on the input line has a second state, the multiplexer circuit passes information on the data address bus therethrough to the common external memory address bus.

The peripheral port includes a bi-directional serial data line, a serial clock line, a first host interface data register connected to the bi-directional serial data line, a second host interface data register connected to the bi-directional serial data line, a master mode state machine connected to the serial clock line, a slave mode state machine connected to the serial clock line and to the bi-directional serial data line, and an address decoder connected to the slave mode state machine and to the first and second host interface data registers. In a master mode, the bi-directional serial data line, the serial clock line, the first and second host interface data registers, and the master mode state machine are utilized. In a slave mode, the bi-directional serial data line, the serial clock line, the first and second host interface data registers, the address decoder, and the slave mode state machine are utilized.

The peripheral port also includes a multiplexer circuit connected to the first host interface data register and to the second host interface data registers and coupled to the bi-directional serial data line. The multiplexer circuit has an input line connected to the master mode state machine. In response to a signal having a first state on the input line, the multiplexer circuit passes therethrough the information in the first host interface register. In response to the signal having a second state on the input line, the multiplexer circuit passes therethrough the information in the second host interface register.

The peripheral port further includes a master mode serial interface control register connected to an internal common memory data bus in the internal common memory bus and having a plurality of parameter lines connected to the master mode state machine; a master mode transfer control register having a read/write start line connected to the master mode state machine; a slave mode status register connected to the bi-directional serial data line; and a command register connected to the bi-directional serial data line.

Thus the integrated circuit of this invention is programmably configurable in both a slave mode of operation and a master mode of operation. The programmable dual functionality of the integrated circuit eliminates the requirement for manufacture of a separate dedicated integrated circuit for application in a particular disk drive. This reduces cost and shortens the development cycle for a disk drive and so reduces time to market of disk drives that utilize the integrated circuit of this invention.

BRIEF DESCRIPTION OF THE DRAWINGS

FIG. 9A illustrates a master mode circuit used for master mode operations and FIG. 9B illustrates a slave mode circuit used for slave mode operations.

DETAILED DESCRIPTION

In accordance with the principles of this invention, a single integrated circuit 150 can be used in high end drives as a slave of a disk drive microcontroller, that is sometimes referred to as the host processor or host microcontroller, and in low end disk drives as a microcontroller that is a master of other disk drive circuitry. Specifically, integrated circuit 150 is programmably configurable in both a slave mode of operation and a master mode of operation. The programmable dual functionality of integrated circuit 150 eliminates the requirement for manufacture of a separate dedicated integrated circuit for application in a particular disk drive. This reduces cost and shortens the development cycle for a disk drive and so reduces time to market of disk drives that utilize integrated circuit 150 of this invention.

In one embodiment, integrated circuit 150 is a mixed signal CMOS large scale integrated circuit that includes a configurable memory interface that allows efficient use of integrated circuit 150 in both master and slave modes of operation. A dual functionality serial host interface is also provided in integrated circuit 150 by peripheral port 100. In addition, to support master mode configurations, integrated circuit 150 has capability for supporting programming of external programmable memories. Finally, integrated circuit 150 has a plurality of general purpose input output (I/O) pins for master mode peripheral control functions.

Figure 1:
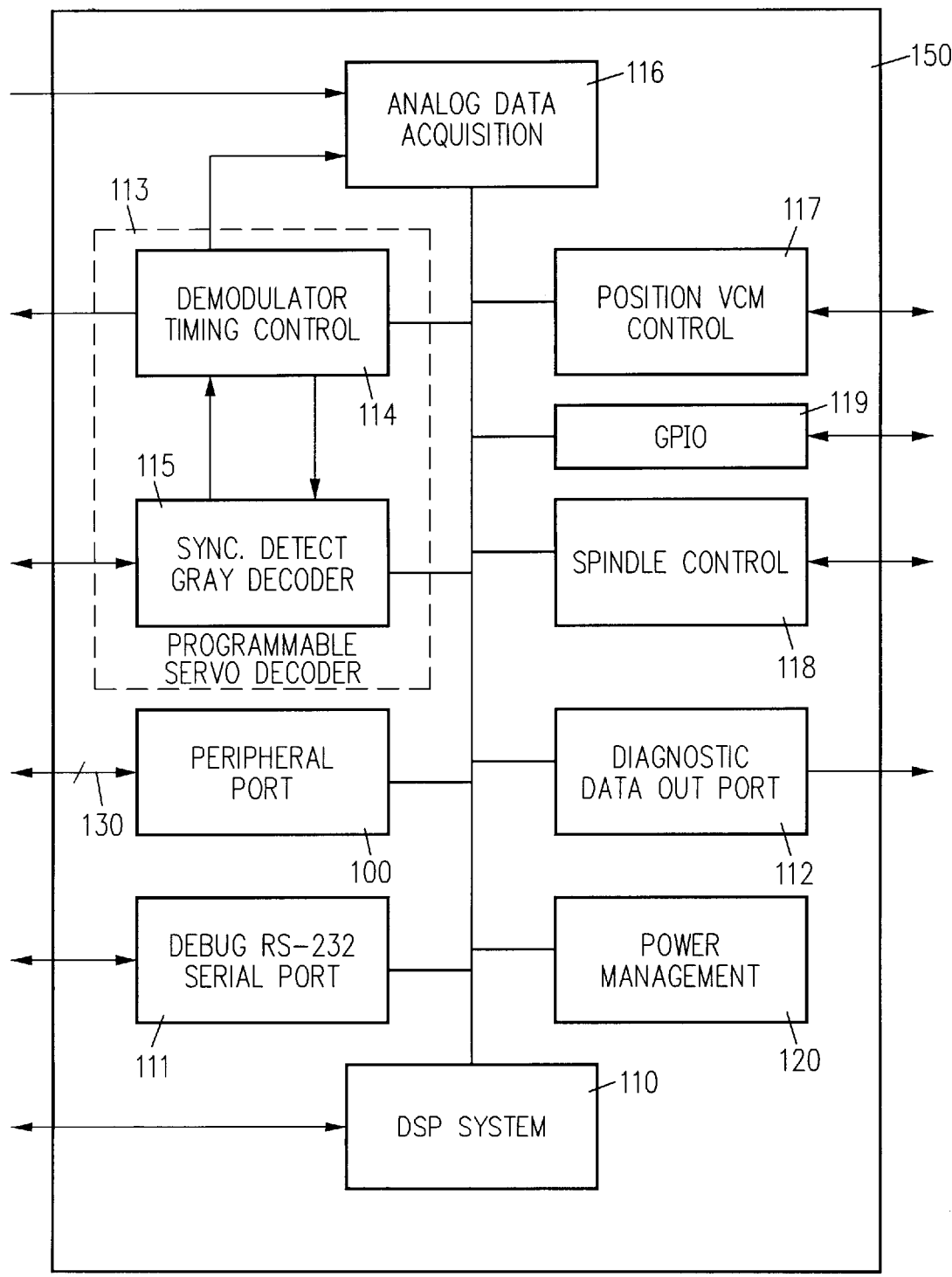
FIG. 1 is a block diagram of an integrated circuit 150 that supports both the master mode and slave mode of t invention.

In the embodiment illustrated in FIG. 1, integrated circuit 150 includes a peripheral port 100 that has a master mode and a slave mode of operation: a diagnostic data port 112; a digital signal processor (DSP) system 110 that includes a DSP core, random access memory (RAM), read-only memory (ROM), timers, and an interrupt controller; a RS-232 serial port 111; a programmable servo burst decoder circuit 113 that includes a synchronization detector and gray code decoder 115, and a demodulator and timing control circuit 114; an analog data acquisition circuit 116; a position VCM control circuit 117; a spindle control circuit 118; a general purpose I/O circuit 119; and a power management circuit 120. The particular configuration of the circuits included within integrated circuit 150 are not critical to this invention. The important aspect is that the circuits within integrated circuit 150 are configured, as described more completely below, so that integrated circuit 150 can operate in both a master mode and a slave mode. Herein, DSP system 110 is sometimes referred to as DSP 110.

One embodiment of programmable servo burst decoder 113 suitable for use in this invention is described in copending, and commonly assigned, U.S. patent application Ser. No. 08/293,981, entitled "A Programmable Servo Burst Decoder" of Nicolas C. Assouad et al., filed on Aug. 22, 1994, which is incorporated herein by reference in its entirety. Programmable servo burst decoder 113 includes a programmable timing mark sequencer as described more completely in copending, and commonly assigned, U.S patent application Ser. No. 08/294,128, entitled "A Programmable Timing Mark Sequencer" of David L. Dyer et al., filed on Aug. 22, 1994, which is incorporated herein by reference in its entirety, and a programmable burst sequencer as described more completely in U.S patent application Ser. No. 08/294,234, entitled "A Programmable Servo Burst Sequencer" of John P. Hill et al., filed on Aug. 22, 1994 that is also incorporated herein by reference in its entirety. One embodiment of an analog data acquisition system 116 suitable for use in this invention is described in copending, and commonly assigned, U.S. patent application Ser. No. 08/293,973, entitled "An Analog Data Acquisition System," of John P. Hill, filed on Aug.22, 1994, which is incorporated herein by reference in its entirety. One embodiment of a diagnostic data port 112 suitable for use in this invention is described in copending, and commonly assigned, U.S. patent application Ser. No. 08/294,127, entitled "Diagnostic Data Port for a LSI or VLSI Integrated Circuit," of John P. Hill, filed on Aug. 22, 1994, which is incorporated herein by reference in its entirety.

In master mode, integrated circuit 150 functions as the disk drive microcontroller and seamlessly interfaces with a hard disk controller. As explained more completely below, integrated circuit 150 includes programmable circuitry for generating individual chip select signals for external random access memory (RAM) and external read-only memory (ROM); a fully programmable general purpose input/output interface; and a programmable bi-directional peripheral port 100. Each of these features are utilized in the master mode to control operation of the disk drive.

In slave mode, integrated circuit 150 provides full motion control of the spin and tracking systems of a disk drive. In slave mode, peripheral port 100 is an interface to a disk drive host microcontroller or a disk drive host RISC processor. The host microcontroller communicates with integrated circuit 150 through a set of mailbox registers within peripheral port 100 to configure integrated circuit 150 for full motion control, and to receive information from integrated circuit 150.

Figure 2:
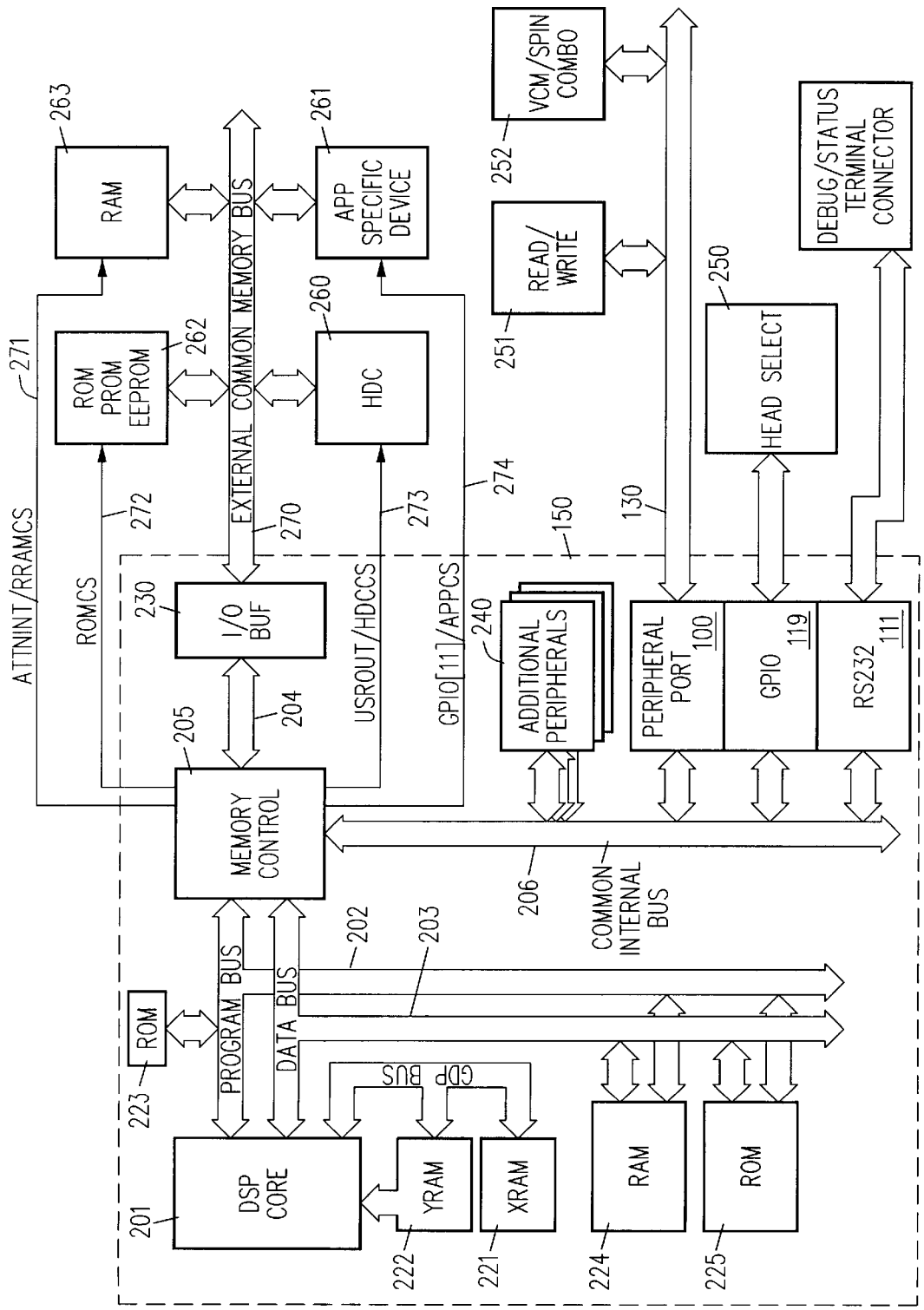
FIG. 2 is a more detailed block diagram of integrated circuit 150 illustrating a configuration that utilizes integrated circuit 150 in a master mode, e.g., as a microcontroller for a disk drive, according to the principles of this invention.

FIG. 2 is a more detailed block diagram of integrated circuit 150 illustrating a configuration that utilizes integrated circuit 150 in a master mode, i.e., as a microcontroller for a disk drive. In FIG. 2, only aspects of integrated circuit 150 directly related to this invention are illustrated. Nevertheless, while not shown, each of the elements shown in FIG. 1, are included within integrated circuit 150 as additional peripherals 240.

DSP 110 includes a DSP core 201 that is connected to a memory controller 205 by a DSP program bus 202 and a DSP data bus 203. DSP core 201, in this embodiment, is a 16-bit general purpose digital signal processor core. DSP core 201 includes three execution units, a computation unit, a data address arithmetic unit, and a program control unit, that execute in parallel. One embodiment of DSP core 201 suitable for use in this invention is available from DSP Group, Inc. of Mountain View, Calif. under the name "Pine DSP Core".

A program ROM 223 is on DSP program bus 202. An X-RAM 221 and a Y-RAM 222, i.e., a first and a second RAM, are on the gdp bus. The configuration of X-RAM 221 and Y-RAM 222 is determined by DSP core 201. An internal program/data ROM 225 and an internal program/data RAM 224 are also on DSP program bus 202 and DSP data bus 203. Memory controller 205 drives and receives information on a common external memory bus 204 that couples memory controller 205 to I/O buffers 230. I/O buffers 230 in turn drive and receive information on an external common memory bus 270. Memory controller 205 also drives and receives information on a common internal memory bus 206.

External common memory bus 270 can accommodate a plurality of memories. In the embodiment of FIG. 2, four different memories are utilized. Memory controller 205 generates an individual chip select signal for each of four external memories 260 to 263, as well as chip select signals for each of the internal memories. In this embodiment, a program/data ROM 262 with external ROM chip select line 272, a program/data RAM 263 with external RAM chip select line 271, a memory in a hard disk controller (HDC) 260 with external HDC chip select line 273, and an user application memory 261 with external user application chip select line 274 are shown on external common memory bus 270.

External ROM chip select line 272 is coupled to memory controller 205 by a package pin ROMCS and external RAM chip select line 271 is coupled to memory controller 205 by a dual function package pin ATTNINT/RAMCS. Similarly, external HDC chip select line 273 is coupled to memory controller 205 by a dual function package pin USROUT/HDCCS, and external user application chip select line 274 is coupled to memory controller 205 by a dual function package pin GPIO[11]/APPCS.

Internal common memory bus 206 interfaces memory controller 205 with the peripherals for DSP core 201 within integrated circuit 150. Specifically, memory mapped I/O registers in peripheral port 100, general purpose I/O circuit 119, RS-232 serial port 111 and additional peripherals 240 are on internal common memory data bus 206. All memory mapped I/O registers in the peripherals for DSP core 201 are accessed via internal common memory bus 206.

As explained more completely below, memory controlled 205 resolves DSP program bus 202 and DSP data bus 203 contentions for common external memory bus 204. Memory controller 205 generates the chip select signals for internal memories 221 to 225 and the memory mapped I/O registers as well as the individual chip select signals for each of external memories 260 to 263, and also generates a programmable number of wait states for each of external memories 260 to 263 based on information received from one or both of DSP program bus 202 and DSP data bus 203. Memory controller 205 supports both 8-bit and 16-bit external data bus widths for external common memory bus 270, and supports programming of ROM 262 for master mode operations when ROM 262 is, for example, any one of an electrically programmable ROM, an electrically erasable and programmable ROM (EEPROM), and a flash EEPROM.

As indicated above, peripheral port 100 includes programmable master and slave functionality. Peripheral port 100 is configured by DSP core 201 for master mode operation when integrated circuit 150 is utilized, for example, as a disk drive microcontroller. In the master mode, information can be transmitted or received through peripheral port 100 from other integrated circuits that interface with DSP core 201 such as a read/write combination integrated circuit 251 and a voice coil motor(VCM)/spin combination integrated circuit 252. Conversely, in a different embodiment (not shown) peripheral port 100 can be configured as a slave and information can either be downloaded from a host microcontroller through peripheral port 100 to integrated circuit 150, or uploaded from integrated circuit 150 to the host microcontroller through peripheral port 100. The specific operation of integrated circuit 150 will depend upon the processes implemented using DSP core 201 by the disk drive manufacturer.

In one embodiment, peripheral port 100 includes a serial port 130. When peripheral port 100 is configured in master mode, serial port 130 serves as a bi-directional synchronous serial port for communication with external integrated circuits 251 and 252 that support disk drive operations. To support the variety of serial interfaces used by various vendors of integrated circuits that support disk drive operations, peripheral port 100 is fully programmable. In this embodiment, as explained more completely below, a user can program the length of both the command and data portions of a transfer, the polarity of signals on the clock and enable lines of serial port 130, and the shift direction of the data. Following the completion of a transfer, a flag is raised which DSP core 201 can detect either by polling a bit or through an interrupt.

When peripheral port 100 is configured in slave mode, peripheral port 100 serves as an interface to a disk drive host microcontroller. In the slave mode, serial port 130 is used to transmit packets of data, e.g., either two or three byte packets, between the host microcontroller and integrated circuit 150. As described more completely below, the first byte is a control packet, sometimes called a control byte, that contains read/write and addressing information. The second byte and the third byte, assuming the third byte is utilized, are either a command, write-data sourced from the host microcontroller, or read-data sourced from integrated circuit 150. The host microcontroller communicates with DSP core 201 through a set of mailbox registers. When the host microcontroller writes to a command register in the set of mailbox registers, a flag is raised which DSP core 201 can detect either by interrupt or by polling so that DSP core 201 can respond to the command.

In this embodiment, the memory mapped I/O registers in peripheral port 100 sit on common internal memory bus 206.

Consequently, any information available to DSP core 201 can be supplied to peripheral port 100 and any data provided to peripheral port 100 are available to DSP core 201. Therefore, DSP core 201 can be utilized in both the master and slave modes of peripheral port 100.

General purpose I/O circuit 119 controls the functions of a plurality of general purpose I/O pins of integrated circuit 150. General purpose I/O circuit 119 has the capability to sense (input) and control (output) external disk drive logic elements, such as read/write head selection logic circuit 250, by receiving digital signals and driving digital signals, respectively, on the plurality of general purpose I/O pins. In one embodiment, bits in a register are used to control the function of each pin in the plurality of general I/O pins. The particular configuration of the bits in the register, and thus the operation of general purpose I/O circuit 119, is determined by the disk drive designer.

Figure 3:
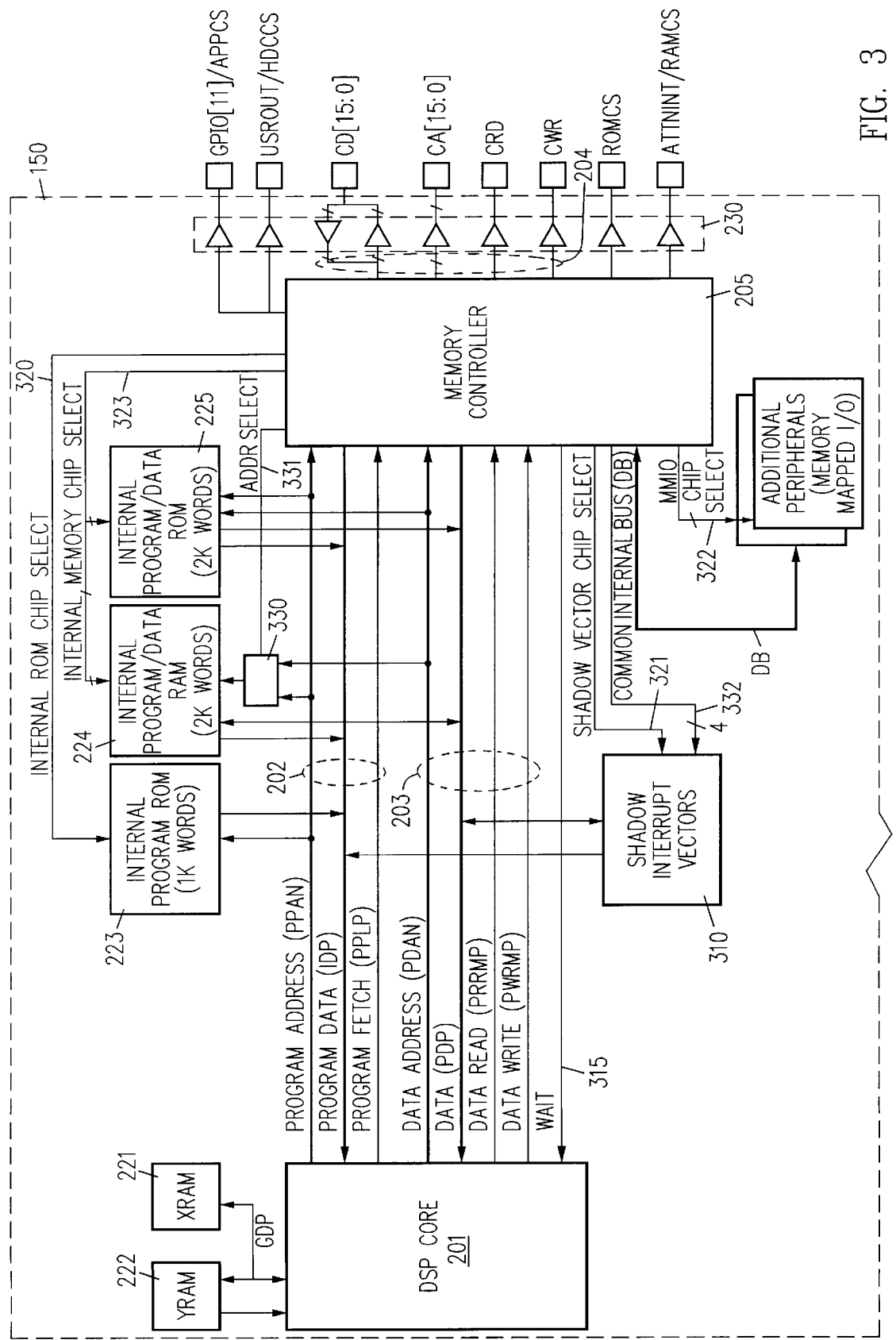
FIG. 3 is a detailed block illustrating the bus and memory configurations within DSP 110 according to the principles of this invention.
Figure 4:
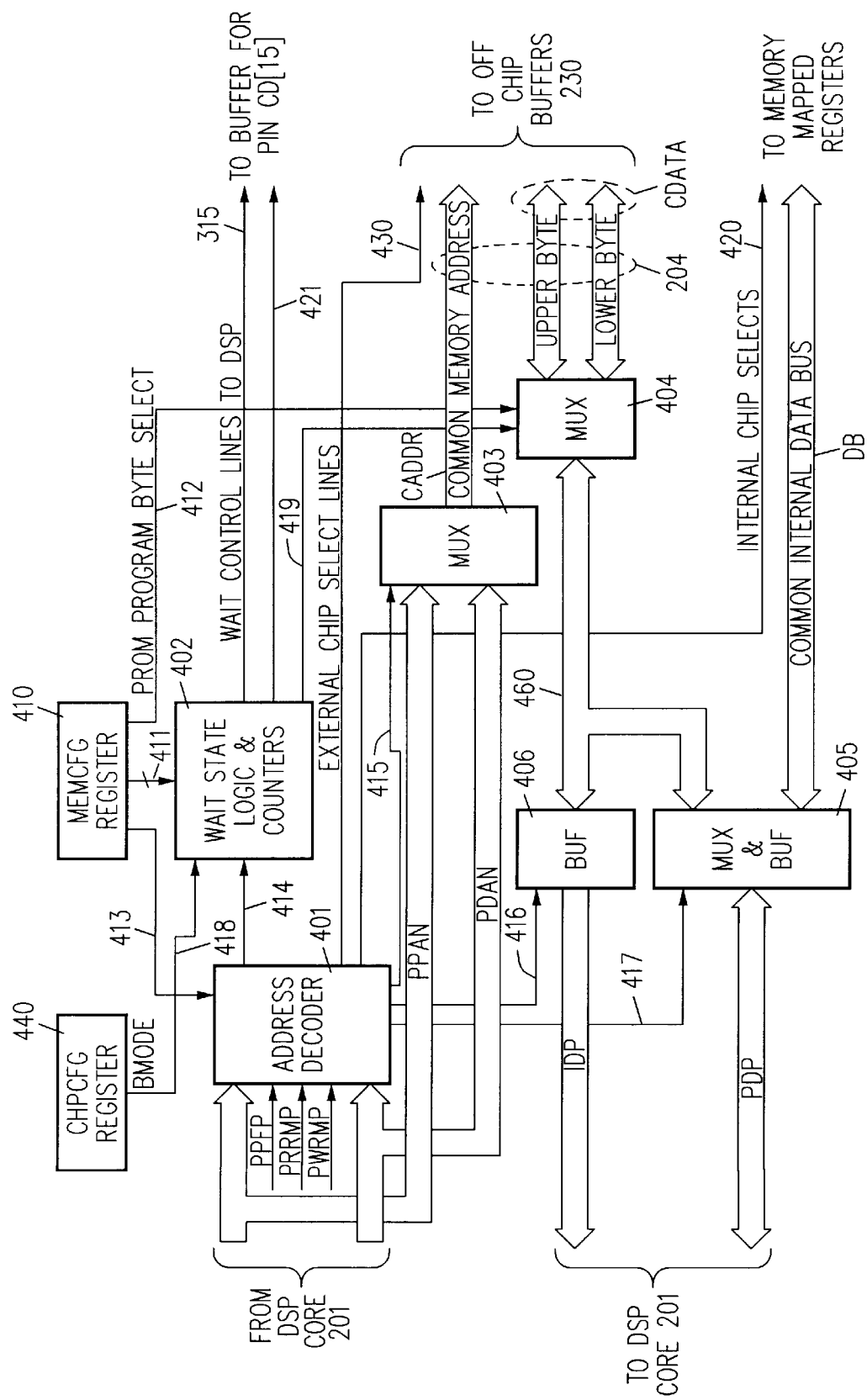
FIG. 4 is a detailed diagram of one embodiment of the memory controller of this invention.
Figure 6:
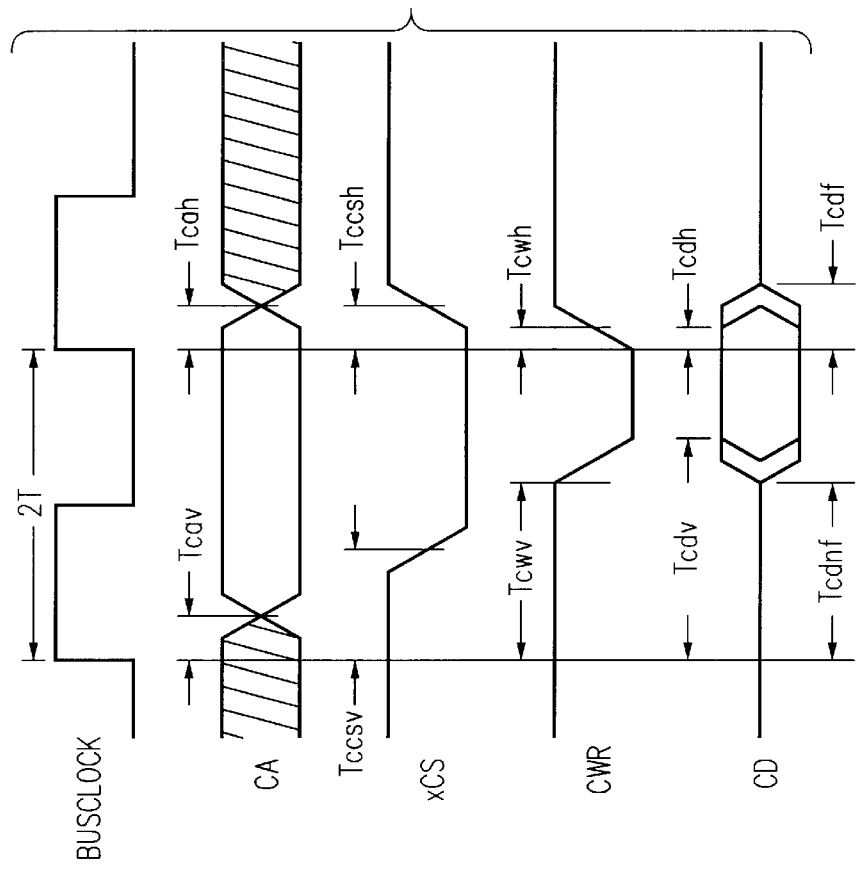
FIGS. 5 to 8 are timing diagrams for reads and writes on the common memory bus with and without wait states in the master and slave modes of this invention that illustrate the timing relationships between the various common memory signals.
Figure 5:
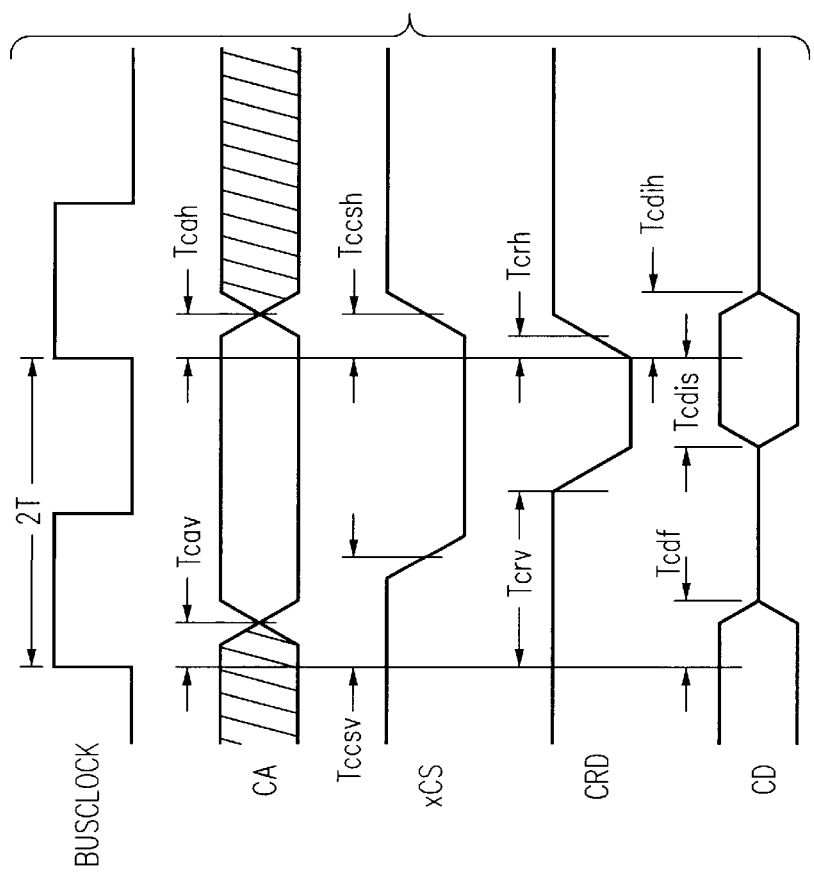
Figure 7:
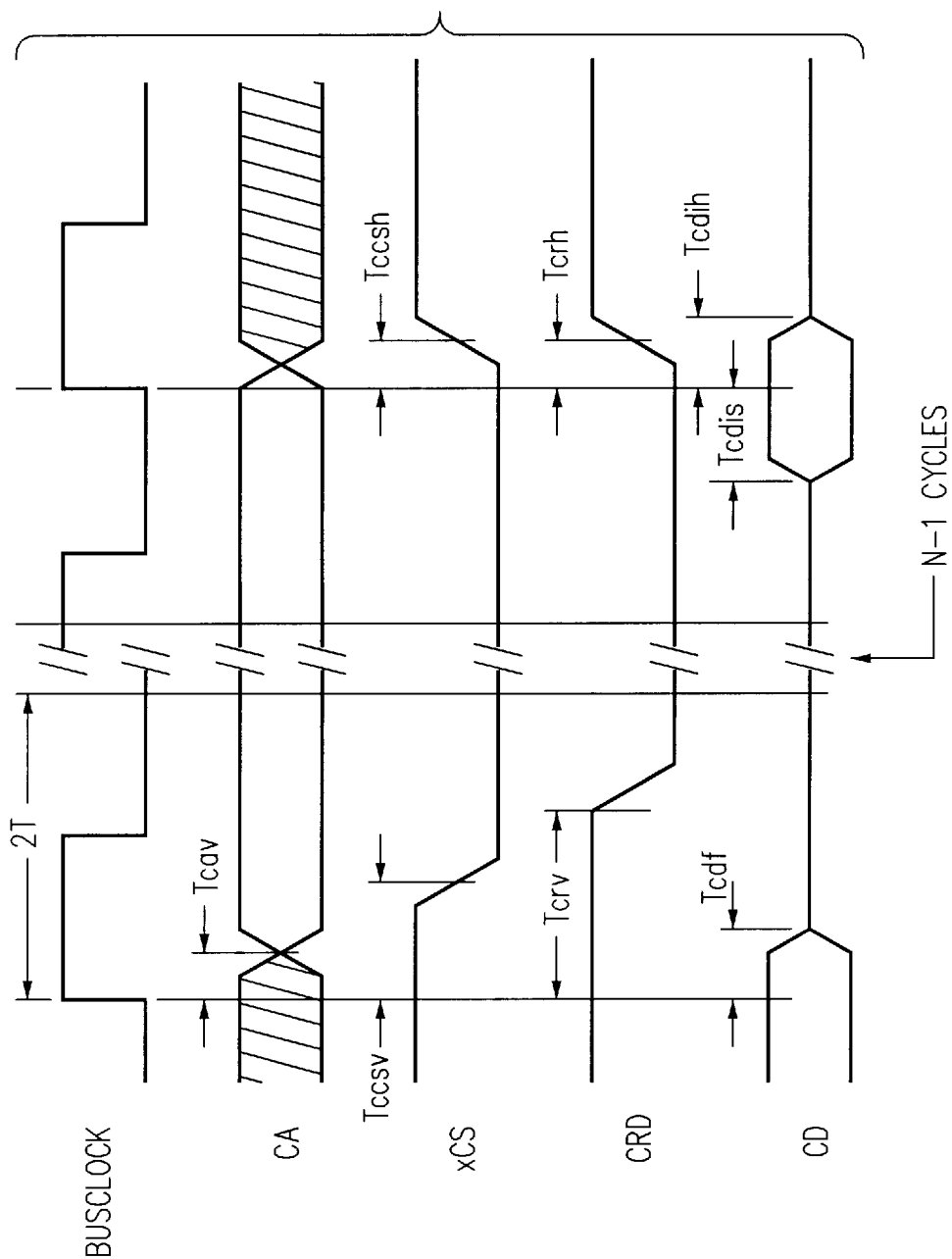
Figure 8:
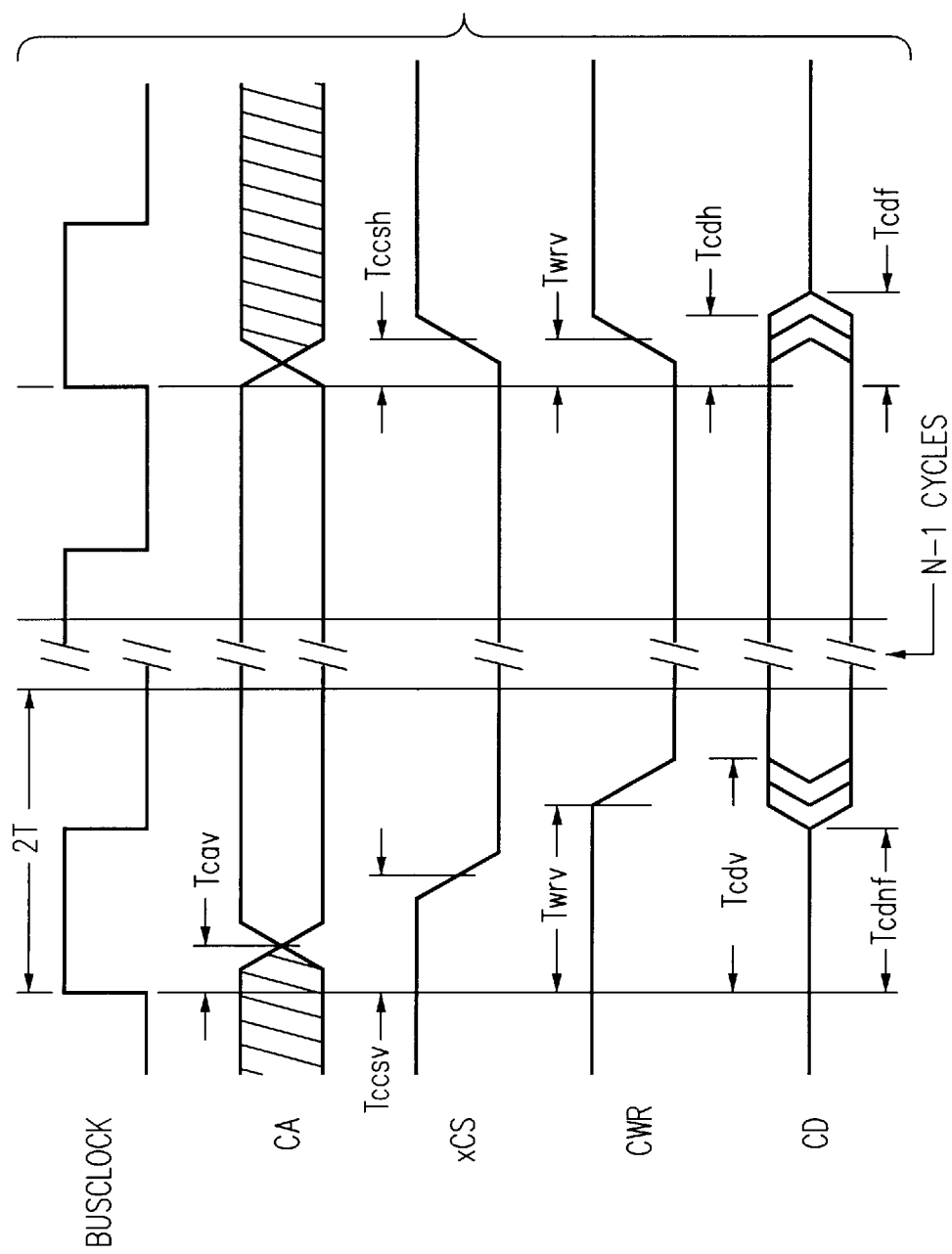

DSP core 201 has a Harvard memory architecture with separate DSP program and data busses 202 and 203 (FIGS. 2 and 3). DSP core 201 has seven memory regions. DSP core 201 decodes three memory regions, i.e., X-RAM 221, Y-RAM 222, and an external memory region. The DSP external memory region is further decoded by memory controller 205 into program ROM 223, program/data memories 224 and 225, memory mapped I/O registers, external program/data memories 262 and 263, and shadow interrupt vector memory 310 that are all mapped on the program and data address spaces of DSP core 201.

As explained above, DSP core 201 uses two separate buses, i.e., a DSP program bus 202, a DSP data bus 203 to access the three memory regions decoded by DSP 201. DSP program bus 202, that includes a 16-bit program address bus PPAN, a 16-bit program data bus IDP, and a program bus read strobe line PPFP, is a read only bus that gives DSP core 201 access to a 64 kilowords (Kwords) program address space. DSP program bus 202 is used by DSP core 201 to fetch DSP instructions. Program ROM 223 is a one kiloword ROM on DSP program bus 202 that receives read signals on internal ROM chip select line 320 from memory controller 205. Program ROM 223 typically contains common routines such as the routines needed to load program/data RAM 224 with software supplied by the disk drive manufacturer.

Since the least significant sixteen words of program ROM 223 can contain DSP interrupt vectors, shadow interrupt vector registers 310 also are on DSP program bus 202. Shadow interrupt vector registers 310 receive read and write signals on shadow vector chip select lines 321 from memory controller 205, and an address on shadow vector address lines 332. In one embodiment, shadow interrupt vectors are a set of five registers that can be mapped over the five DSP interrupt vector locations utilized in program ROM 223. This allows the user to configure all interrupt registers.

DSP data bus 203, that includes a 16-bit address bus PDAN, a 16-bit data bus PDP, a data bus write strobe line PWRMP, and a data bus read strobe line PRRMP, is a bi-directional bus that gives DSP core 201 access to a 64 Kword data address space. DSP data bus 203 is used by DSP core 201 to fetch DSP instruction operands and to write values in the data memory. Shadow interrupt vector registers 310 are also on DSP data bus 203. As explained above, memory mapped I/O registers are also on internal common memory bus data bus DB and receives an individual memory mapped I/O chip read select signal and I/O write select signals from memory controller 205 on lines 322. The memory mapped I/O registers are located on a 256 word page to allow easy direct addressing by DSP core 201.

As indicated above, memory controller 205 is an interface between DSP program bus 202 and DSP data bus 203 and common external memory bus 204 and internal common memory bus 206. Common external memory bus 204 includes a 16-bit address bus, a 16-bit bidirectional data bus, a common memory bus write strobe line, and a common memory bus read strobe line. Common external memory bus 204 gives DSP core 201 access to external memories that may be mapped into either or both of the program and data address spaces.

Internal common memory bus 206 includes a 16-bit common memory internal data bus DB and a plurality of memory-mapped I/O register select lines 322. Internal common memory bus 206 also gives DSP core 201 access to internal memory-mapped I/O registers that may be mapped into the data address space. Memory controller 205 time multiplexes accesses to common external memory bus 204 and internal common memory bus 206 from both DSP program bus 202 and DSP data bus 203.

Internal program/data ROM 225 is a two kiloword ROM that is on DSP program bus 202 and DSP data bus 203. Program/data ROM 225 receives internal program/data ROM read signals on a first line in internal memory chip select lines 323 from memory controller 205. Program/data ROM 225 receives addresses from program address bus PPAN and data address bus PDAN and an internal multiplexer selects one of the two addresses. The technique used to select one of the two addresses for program/data ROM 225 depends on the particular ROM implementation and so is not of importance to this invention. The important aspect, in this embodiment, is that program/data ROM 225 is accessible by both DSP program bus 202 and DSP data bus 203.

Program/Data RAM 224 is a two kiloword RAM that also is on DSP program bus 202 and DSP data bus 203 and receives internal program/data RAM read and write signals on a second and third line in internal memory chip select lines 323 from memory controller 205. Multiplexer 330 receives addresses from program address bus PPAN and data address bus PDAN. A signal on address select line 331 from memory controller 205 configures multiplexer 330 to pass one of the two address therethrough to internal program/data RAM 224. As for program/data ROM 225, the technique used to select one of the two addresses for program/data RAM 224 depends on the particular RAM implementation and so is not of importance to this invention. The important aspect, in this embodiment, is that program/data RAM 224 is accessible by both DSP program bus 202 and DSP data bus 203.

In this embodiment, external memories 260 to 263 are connected to integrated circuit 150 through common memory bus address pins CA[15:0], common memory bus data pins CD[15:0], common memory bus read strobe pin CRD, common memory bus write strobe pin CWR, and a plurality of external memory chip select pins. Each of external memories 260 to 263 has an individual chip select and can be configured for between zero and three wait states.

One embodiment of a data memory map for the data memory address space of DSP core 201 is given in Table 1. Table 2 is one embodiment of a program memory map for the program memory address space of DSP core 201.

TABLE 1

Data Memory Map

| Memory Name | Start Address | End Address | Comment |
|---|---|---|---|
| X-RAM 221 | 0000H | 00FFH | 256 Word On-core X-RAM address space. |
| Reserved | 0100H | 03FFH | On-core X-RAM expansion address space. |
| Reserved | 0400H | 0FFFH | |
| Program/ Data RAM 224 (Internal) | 1000H | 17FFH | 2K internal data/program RAM address space. Same physical memory as in program address map. |
| Program/ Data ROM 225 (Internal) | 1800H | 1FFFH | 2K Internal data/program ROM address space. Same physical memory as in program address map. |
| Prog/Data Memory Bank 0 (External) | 2000H | 3FFFH | 8K of address space for external RAM 263, or external ROM. |
| Prog/Data Memory Bank 1 (External) | 4000H | 5FFFH | BK of address space for external RAM 263, or external ROM. |
| Prog/Data Memory Bank 2 (External) | 6000H | 7FFFH | 8K of address space for External RAM 263, or external ROM. |
| Prog/Data Memory Bank 3 (External) | 8000H | 9FFFH | 8K of address space for External RAM 263, or external ROM. |
| PROM program window (External) | A000H | BFFFH | External ROM address space. |
| Application Memory 261 | C000H | CFFFH | User application address space. |
| HDC Memory 260 | D000H | DFFFH | HDC address space. |
| Mem. Mapped I/O | E000H | E0FFH | Memory mapped I/O address space. |
| Burst Seq. RAM | E100H | E17FH | Burst sequencer instruction RAM address space |
| Reserved | E180H | E1FFH | |
| Timing Mark Seq. RAM | E200H | E21FH | Timing mark sequencer instruction RAM address space |
| Reserved | E220H | EEFFH | |
| Shadow Reset Vector | EF00H | EE01H | |
| Reserved | EF02H | EF07H | |
| Shadow BPI Vector | EF08H | EF09H | |
| Shadow Trap Vector | EF0AH | EF0BH | |
| Shadow INT0 Vector | EF0CH | EF0DH | |
| Shadow INT1 Vector | EF0EH | EF0FH | |
| Reserved | EF10H | EFFFH | |
| Reserved | F000H | FBFFH | |
| Reserved | FC00H | FEFFH | On-core Y-RAM expansion space. |
| Y-RAM 222 | FF00H | FFFFH | 256 word on-core Y-RAM address space. |

TABLE 2

Program Memory Map

| Memory Name | Start Address | End Address | Comments |
|---|---|---|---|
| Reset Vector | 0000H | 0001H | Reset interrupt vector address space. |
| Reserved | 0002H | 0007H | |
| BPI Vector | 0008H | 0009H | Break point interrupt vector address space. |
| Trap Vector | 000AH | 000BH | Trap interrupt vector address space. |
| INT0 Vector | 000CH | 000DH | Interrupt 0 vector address space. |
| INT1 Vector | 000EH | 000FH | Interrupt 1 vector address space. |
| Program ROM 223 (Internal) | 0010H | 03FFH | 1K internal program ROM address space. |
| Reserved | 0400H | 0FFFH | |
| Program/ Data RAM 224 (Internal) | 1000H | 17FFH | 2K internal program/ data RAM address space. This is the same physical memory as in the Data Address Map. |
| Program/ Data ROM 225 (Internal) | 1800H | 1FFH | 2K internal program/ data ROM address space. This is the same physical memory as in the Data Address Map. |
| Program/ Data Memory Bank 0 (External) | 2000H | 3FFFH | 8K of address space for external RAM 263 or external ROM. |
| Program/ Data Memory Bank 1 (External) | 4000H | 5FFFH | 8K of address space for external RAM 263 or external ROM. |
| Program/ Data Memory Bank 2 (External) | 6000H | 7FFFH | 8K of address space for external RAM 263 or external ROM. |
| Program/ Data Memory Bank 3 (External) | 8000H | 9FFFH | 8K of address space for external RAM 263 or external ROM. |
| Program ROM (External) | A000H | DFFFH | 16K of program address space. |
| Program ROM (External) | E000H | EFFFH | 4K of program address space. EFF0H - User Baud Rate Address EFF1H - User Code Address |
| Program ROM (External) | F000H | FFFFH | 4K of program address space. Reserved for In-circuit Emulation (ICE) operating system if ICE is used |

The burst sequencer RAM is described in U.S patent application Ser. No. 08/294,234, entitled "A Programmable Servo Burst Sequencer" of John P. Hill et al., filed on Aug. 22, 1994. The timing mark sequencer RAM is described U.S patent application Ser. No. 08/294,128, entitled "A Programmable Timing Mark Sequencer" of David L. Dyer, filed on Aug. 22, 1994. Program ROM 262 and program/data RAM 263 combined can form up to 56 Kwords of external memory in the program address space.

As shown above in Tables 1 and 2, external program/data RAM 263 is divided into four eight kiloword banks for a total of 32 Kwords. Thus, depending on the size of external RAM 263, various combinations of sizes of external ROM 262 and RAM 263 are possible. Specifically, in this embodiment, the supported configurations of external ROM 262 and RAM 263 are given below in Table 3.

TABLE 3

External Program Space RAM/ROM Configurations

| Ext. RAM Enable | Ext RAM Bank Select | Maximum External RAM | Maximum External ROM |
|---|---|---|---|
| 0 | xx | 0 Kwords | 56 Kwords |
| 1 | 00 | 8 Kwords | 48 Kwords |
| 1 | 01 | 16 Kwords | 40 Kwords |
| 1 | 10 | 24 Kwords | 32 Kwords |
| 1 | 11 | 32 Kwords | 24 Kwords |

The first two columns of Table 3 indicate the state of an external RAM enable bit and external RAM bank select bits, respectively in a memory configuration register (See Table 5) of DSP 110, that is described more completely below.

As indicated above, memory controller 205 directs program and data accesses to all memories on common external memory bus 204 and to memory-mapped registers on internal common memory bus 206. DSP core 201 can start both a program fetch and a data read or a data write operation once per DSP clock cycle. Since memory controller 205 decodes the memory accesses on common external memory bus 204 and internal common memory bus 206, concurrent program and data accesses across common external memory bus 204 are serialized.

Each memory transaction can take from one to four DSP clock cycles to complete. All transactions to memory internal to integrated circuit 150 are zero wait state transactions and require one DSP clock cycle to complete. All external memory transactions use wait states with a programmable duration, as described more completely below.

In this embodiment, memory controller 205 assumes that DSP core 201 starts a program fetch to an external memory on every DSP clock cycle. Thus, memory controller 205 starts with a program memory access on common external memory bus 204 and then performs a data memory access on common external memory bus 204, if required. If for a given DSP instruction cycle, DSP core 201 is not accessing external program memory, a one cycle dummy transaction is inserted on common external memory bus 204, i.e., memory controller 205 does nothing for one DSP clock cycle, and then proceeds to do any requested data transaction. Hence, any data bus cycle by DSP core 201 to external data memory follows the completion of the program bus cycle or the one cycle dummy transaction. If a program fetch is made to internal memory, memory controller 205 waits one clock cycle and then starts any waiting data transaction for external memory. The insertion of the dummy cycles simplified the design of memory controller 205 and does not significantly affect performance because the majority of the time DSP core 201 fetches a program instruction from external memory.

Table 4 shows the possible combinations of transactions on common external memory bus 204 for each instruction cycle of DSP core 201. In Table 4, the phrase "common bus" refers to common external memory bus 204.

TABLE 4

Common Bus Transaction Sequences

| Prog. Fetch Destination | Data Fetch Destination | Common Bus First Transaction Type | Common Bus Second Transaction Type |
|---|---|---|---|
| Prog. Bus | Data Bus | Prog. Dummy Cycle | No Cycle |
| Prog. Bus | Common Bus | Prog. Dummy Cycle | Data Cycle |
| Common Bus | Data Bus | Program Cycle | No Cycle |
| Common Bus | Common Bus | Program Cycle | Data Cycle |

The generation of chip select signals and wait states for external memories 260 to 263 by memory controller 205 is controlled by the state of bits in memory configuration register 410 that is programmably configurable by the user. Table 5 is one embodiment memory configuration register 410.

TABLE 5

Memory Configuration Register (MEMCFG)

| Bit(s) | rw | Reset | Description |
|---|---|---|---|
| 15:13 | rw | 000 | PROM Program Window Select |
| 12 | rw | 0 | PROM Program Byte Select |
| 11 | rw | 1 | APP Chip Select Enable |
| 10:09 | rw | 11 | HDC/APP Wait States |
| 08 | rw | 1 | HDC Chip Select Enable |
| 07:06 | rw | 11 | External ROM Wait States |
| 05:04 | rw | 11 | External RAM Wait States |
| 03:02 | rw | 10 | External RAM Bank Select |
| 01 | rw | 1 | External RAM Enable |
| 00 | rw | 0 | PROM Program Mode Select |

In generating the chip select signals, memory controller 205 decodes addresses received on program address bus PPAN or data address bus PDAN. If the address is for a memory location within integrated circuit 150, address decoder circuit 401 drives an active signal on a chip select line within internal chip select lines 420 for the memory specified by the address, as defined above in Tables 1 and 2. The particular chip select line used is determined not only by the address, but also by which of program bus read strobe line PPFP, data bus read strobe line PRRMP, and data bus write strobe line PWRMP provides a strobe signal to address decoder circuit 401.

Similarly, in response to an address on program address bus PPAN from DSP core 201 for a location in an external RAM bank, address decoder circuit 401 in memory controller 205 drives an active signal on an external RAM select line for external RAM 263 containing the addressed location, as defined in Tables 1 and 2 if certain conditions are satisfied.

Specifically, when the address on program address bus PPAN is for one of the external banks of RAM, not only must the external RAM enable bit be set, but also the external RAM bank select bits in memory configuration register 410 (Table 5) must be set so that the addressed bank is selected. If all three of these conditions are true, an active chip select signal is generated by address decoder circuit 401 on an external RAM select line within external chip select lines 430. In addition, if a strobe signal is received by address decoder circuit 401 on either program bus read strobe line PPFP or data bus read strobe line PRRMP, address decoder circuit 401 generates a strobe signal on pin CRD. Conversely, if a strobe signal is received by address decoder circuit 401 on data bus write strobe line PWRMP address decoder circuit 401 generates a strobe signal on pin CWR.

One embodiment of the configuration of the external RAM bank select bits in memory configuration register 410 is given in Table 6.

TABLE 6

Number of Banks of External RAM
Supplied Chip Select Signal

| External RAM Bank Select Bits | Banks of External RAM 263 That Receive Chip Select Signal |
|---|---|
| 00 | Bank 0 |
| 01 | Banks 0 & 1 |
| 10 | Banks 0 to 2 |
| 11 | Banks 0 to 3 |

When the address on program address bus PPAN is for a location in a particular external RAM bank and the external RAM enable bit is set, but the external RAM bank select bits are not set, an active ROM chip select signal is generated on an external ROM chip select line within lines 430. In this case, at least a portion of RAM 263 has been replaced with ROM and so the ROM chip select signal is required.

In the previous discussion, an address for external RAM 263 on program address bus PPAN was considered. The operation of memory controller 205 for an address for external RAM 263 on data address bus PDAN is the same as that just described with the data address bus PDAN substituted for the program address bus PPAN and so the description is not repeated.

In one embodiment, one I/O pin of integrated circuit 150, e.g., pin ATTNINT/RAMCS, is multiplexed and functions either as a host interrupt output pin for slave mode operations, or an external RAM chip select signal output pin for master mode operations. If the external RAM enable bit is not set, pin ATTNINT/RAMCS (FIG. 3) is a host interrupt output pin. However, if the external RAM enable bit is set, pin ATTNINT/RAMCS is used as an output pin for the external RAM chip select signal.

In response to an address for a location in application memory 261 on data address bus PDAN, address decoder circuit 401 in memory controller 205 drives an active signal on an application memory select line within external chip select lines 430 for application memory 261, if the APP chip select enable bit in memory configuration register 410 is set. Similarly, in response to an address for a location in memory of the HDC on data address bus PDAN, address decoder circuit 401 in memory controller 205 drives an active signal on a HDC memory select line in external chip select lines 430, if the HDC chip select enable bit is set in memory configuration register 410.

In one embodiment, one of the general purpose I/O pins of integrated circuit 150, e.g., pin GPIO[11], is multiplexed. If the APP chip select enable bit is not set, pin GPIO[11] is available as a general purpose I/O pin. However, if the APP chip select enable bit is set, pin GPIO[11] is used as pin APPCS and carries the application memory chip select signal from address decoder circuit 401.

Another I/O pin of integrated circuit 150, e.g., pin USROUT/HDCCS (FIG. 2), is multiplexed and functions either as a user defined output pin that is directly controllable by DSP 110, or as a HDC memory chip select signal output pin. If the HDC chip select enable bit is not set, pin USROUT/HDCCS is a user defined output pin. However, if the HDC chip select enable bit is set, pin USROUT/HDCCS is used as an output pin for the HDC memory chip select signal from address decoder circuit 401.

The user of integrated circuit 150 can program memory controller 205 so that external ROM 262, external RAM 263, HDC memory 260, and application memory 261 each have between zero and three wait states where one wait state equals one DSP clock cycle. In this embodiment, the number of wait states generated by memory controller 205 are programmed through memory configuration register 410. The HDC/APP wait state bits in memory configuration register 410 define the number of wait states generated for user application memory 261 and HDC memory 260. The external ROM wait state bits in memory configuration register 410 define the number of wait states generated during external ROM transactions. The external RAM wait state bits in memory configuration register 410 define the number of wait states generated for transactions with external RAM banks 263 that are selected by the external RAM bank select bits in memory configuration register 410.

The values of the wait state bits in memory configuration 410 are supplied to wait state logic and counter circuit 402 via lines 411. When address decoder circuit 401 decodes an address for an external memory, a load counter signal is generated by address decoder circuit 401 on a line for that external memory in lines 414 to wait state logic and counters circuit 402. In response to the load counter signal for the external memory, wait state logic and counter circuit 402 loads a counter with the number of wait states for that external memory based on the bit settings in register 410 and drives the signal on wait control line 315 (FIG. 3) to DSP core 201 active.

When the external memory specified by DSP core 201 is external RAM 263, wait state logic and counters circuit 402 drives the signal active on wait control line 315, i.e., generates the wait states for external RAM 263, only if the external RAM enable bit in memory configuration register 410 is set. The signal on wait control line 315 remains active until the counter times out and then the signal is driven inactive if the signal on bus mode line 418 from chip configuration register 440 indicates that common memory data bus CDATA is configured for 16-bit operation. The generation of the signal on bus mode line 418 is described more completely below. If the signal on bus mode line 418 indicates that common memory data bus CDATA is configured for 8-bit operation, the counter is restarted when the counter times out the first time and the signal on wait control line 315 is held active. When the counter times out for the second time, the signal on wait control line 315 is driven inactive.

On reset of DSP 110, the wait states for all external memories in memory configuration register 410 default to three wait states. Although the HDC memory region, in this embodiment is defined by addresses in the range of D000H to DFFFH, HDC wait states are generated on all memory accesses with addresses in the range of C000H to DFFFH. This allows the user to add additional parallel peripherals in the application space memory range of addresses from C000H to CFFFH.

Table 7 and Table 8 show the memory access times for all combinations of program, data and common bus accesses including wait states for 16-bit and 8-bit accesses respectively. Program fetches from internal ROM 225 are not given in Tables 7 and 8 because the memory access times are the same as for program ROM 223.

TABLE 7

Memory Access Cycle Times (16-bit Bus Mode)

| Program Bus Access | Data Bus Access | Memory Cycles to Complete Access |
|---|---|---|
| Program ROM 223 | None | 1 |
| Program ROM 223 | X-RAM 221 or Y-RAM 222 | 1 |
| Program ROM 223 | Mem. Map. I/O | |
| Program ROM 223 | Internal RAM 224 | 2 |
| Program ROM 223 | External Mem. | 2+ (Wait States for accessed memory region) |
| Program ROM 223 | Shadow Vector RAM 310 | 1 |
| Shadow Vector RAM 310 | None | 1 |
| Shadow Vector RAM 310 | X-RAM 221 or Y-RAM 222 | 1 |
| Shadow Vector RAM 310 | Mem. Map. I/O | 1 |
| Shadow Vector RAM 310 | Internal RAM 224 | 2 |
| Shadow Vector RAM 310 | External Mem | 1+ (Wait States for accessed memory region) |
| Internal RAM 224 | None | 1 |
| Internal RAM 224 | X-RAM 221 or Y-RAM 222 | 1 |
| Internal RAM 224 | Mem. Map. I/O | 1 |
| Internal RAM 224 | Internal RAM 224 | 2 |
| Internal RAM 224 | External Mem. | 2+ (Wait States for accessed memory region) |
| Internal RAM 224 | Shadow Vector RAM 310 | 1 |
| External Mem. | None | 1+ (Wait States for accessed memory region) |
| External Mem. | X-RAM 221 or Y-RAM 222 | 1+ (Wait States for accessed memory region) |
| External Mem. | Mem. Map. I/O | 1+ (Wait States for accessed memory region) |
| External Mem. | Internal RAM 224 | 2+ (Wait States for accessed memory region) |
| External Mem. | External Mem. | (Wait States for accessed prog. mem. region +1) + (Wait States for accessed data mem. region +1) |
| External Mem. | Shadow Vector RAM 310 | 1+ (Wait States for accessed memory region) |

TABLE 8

Memory Access Cycle Times (8-bit Bus Mode)

| Program Bus Access | Data Bus Access | Memory Cycles to Complete Access |
|---|---|---|
| Program ROM 223 | None | 1 |
| Program ROM 223 | X-RAM 221 or Y-RAM 222 | 1 |
| Program ROM 223 | Mem. Map. I/O | 1 |
| Program ROM 223 | Internal RAM 224 | 2 |
| Program ROM 223 | External Mem. | 2+ (Wait States for accessed memory region) *2 |
| Program ROM 223 | Shadow Vector RAM 310 | 1 |
| Shadow Vector RAM 310 | None | 1 |
| Shadow Vector RAM 310 | X-RAM 221 or Y-RAM 222 | 1 |
| Shadow Vector RAM 310 | Mem. Map. I/O | 1 |
| Shadow Vector RAM 310 | Internal RAM 224 | 2 |
| Shadow Vector RAM 310 | External Mem | 1+ (Wait States for accessed memory region) *2 |
| Internal RAM 224 | None | 1 |
| Internal RAM 224 | X-RAM 221 or Y-RAM 222 | 1 |
| Internal RAM 224 | Mem. Map. I/O | 1 |
| Internal RAM 224 | Internal RAM 224 | 2 |
| Internal RAM 224 | External Mem. | 2+ (Wait States for accessed memory region) *2 |
| Internal RAM 224 | Shadow Vector RAM 310 | 1 |
| External Mem. | None | 1+ (Wait States for accessed memory region) *2 |
| External Mem. | X-RAM 221 or Y-RAM 222 | 1+ (Wait States for accessed memory region) *2 |
| External Mem. | Mem. Map. I/O. | 1+ (Wait States for accessed memory region) *2 |
| External Mem. | Internal RAM 224 | 2+ (Wait States for accessed memory region) *2 |
| External Mem | External Mem. | ((Wait States for accessed memory prog. mem. region +1) + (Wait States for accessed data mem..region +1)) *2 |
| External Mem. | Shadow Vector RAM 310 | 1+ (Wait States for accessed memory region) *2 |

In addition to generating chip enable signals and wait state enable signals, address decoder circuit 401 also controls the operation of multiplexer circuit 403, three state buffer circuit 406, and multiplexer and buffer circuit 405. Any addresses on program address bus PPAN and data address bus PDAN are applied simultaneously to address decoder circuit 401 and to multiplexer circuit 403. During a first DSP cycle, address decoder circuit generates a signal on line 415 to multiplexer circuit 403 so that multiplexer circuit 403 passes therethrough any address on program address bus PPAN to common memory address bus CADDR if the memory address from DSP core 201 is for an external memory.

Also, on the first DSP clock cycle, address decoder circuit 401 generates a signal on line 416 to three state buffer circuit 406 so that the buffers therein go from the high impedance state to passing any signal on bus 460 to program data bus IDP. Bus 460 communicates with multiplexer circuit 404.

The operation of multiplexer circuit 404 is controlled by the signals on lines 419 from wait state logic and counters circuit 402, and PROM byte select line 412 from memory configuration register 410. As explained more completely below, a PROM program byte select bit in memory configuration register 410 controls the state of pin CD[15]/BSEL only in programming operations when memory controller 205 is configured for an eight-bit external common memory data bus.

Memory controller 205 supports both eight-bit and sixteen-bit external common memory data bus widths in external common memory bus 270. External data bus width is programmable via the BMODE bit in a chip configuration register 440 (Table 10) in DSP 110. When the BMODE bit is set, memory controller 205 is configured to access an eight-bit wide external common memory data bus and conversely when the BMODE bit is not set, memory controller 205 is configured to access a 16-bit wide external common memory data bus.

Thus, in response to the first DSP clock cycle, multiplexer circuit 404 receives a signal on a bus width line in lines 419 so that multiplexer circuit 404 passes the information on the lower and upper bytes of external common memory data bus CDATA therethrough if the signal on bus mode line 418 is inactive. Conversely, if the signal on bus mode line is active, the operation of multiplexer circuit 404 is controlled by the states of the signals on a byte control line in lines 419.

In response to the first DSP clock cycle and the read signal on line PPRP, when the counter is initially loaded in wait state logic & counters circuit 402, as described above, the signals on line 421 and a byte control line in lines 419 have a first state. A signal on a read line in lines 419 has a second state so that multiplexer circuit 404 is configured to pass information on the lower byte of common memory data bus CDATA to bus 460. Thus, the information at the memory location specified on common memory address bus CDADDR is driven on the lower byte of common memory data bus CDATA. The information on the lower byte of common memory data bus CDATA is driven on the lower byte of bus 460 by multiplexer circuit 404 because the signal on the byte control line has the first state. The three state input buffers of multiplexer circuit 404 drive a soft latch that is controlled by the signal level on the enable line of the three state input buffers. As is known to those skilled in the art, the use of a soft latch does not require a separate latch enable line.

When the counter in wait state logic & counters circuit 402 times out and is restarted, the signals on line 421 and the byte control line in lines 419 are driven to a second state that is different from the first state. In response to the signal on line 421, the state of the signal on common data bus pin CD[15] is changed and so the information at the memory location specified on common memory address bus CDADDR plus one byte is driven on the lower byte of common memory data bus CDATA.

The change in state of the signal on the byte control line in lines 419 to multiplexer circuit 404 causes multiplexer circuit 404 to pass the information on the low byte of common memory data bus CDATA to the upper byte of bus 460. Thus, a word is driven by multiplexer circuit 404 onto bus 460 and passed through buffer circuit 460 to program data bus IDP. Herein, a low byte refers to the least significant byte of a word and an upper byte or an high byte refers to the most significant byte of the word.

The previous discussion assumed that the address on program address bus PPAN during the first DSP instruction cycle was for a location in an external memory. However, if the program address bus PPAN is for location in an internal memory, a read signal is driven active on the appropriate line within internal chip select lines 420 and the selected memory directly drives program data bus IDP with the information. In this case, address decoder circuit 401 does not drive an active signal on line 416 to buffer circuit 406 and so bus 460 can not drive program data bus IDP.

After the first DSP clock cycle and the appropriate number of wait states, an edge of a second DSP clock cycle causes address decoder circuit 401 to change the state of the signal on line 415 to multiplexer circuit 403 so that multiplexer circuit 403 passes the information on data address bus PDAN therethrough to common memory address bus CADDR. In response the edge of the second DSP clock cycle, address decoder circuit 401 also changes the state of the signal on line 416 to buffer circuit 406 so that bus 460 no longer communicates with program data bus IDP.

If the address on data address bus is for an external memory and a read operation is indicated by the signal on line PRRMP, address decoder circuit 401 generates signals on lines 417 to configure multiplexer and buffer circuit 405 so that bus 460 is driving data bus PDP. If common memory data bus CDATA is configured in the 16-bit mode, the information on common memory data bus CDATA is passed through multiplexer circuit 404 to bus 460. If common data bus CDATA is configured in the 8-bit mode, information is passed through multiplexer circuit 404 to bus 460 in the same manner as described above during the period following the first DSP clock cycle.

If the address on data address bus is for an external memory and a write operation is indicated by the signal on line PWRMP, address decoder circuit 401 generates signals on lines 417 to configure multiplexer and buffer circuit 405 so that bus 460 is driven by information on data bus PDP. If common memory data bus CDATA is configured in the 16-bit mode, the information on bus 460 is passed through multiplexer circuit 404 to common memory data bus CDATA. If common memory data bus CDATA is configured in the 8-bit mode, as explained above, the operation of multiplexer circuit 404 is controlled by the signals on lines 419.

In response to the second DSP clock cycle, the address on program data bus PDAN, and the signal on program data write strobe line PWRMP, when the counter is initially loaded in wait state logic & counters circuit 402, as described above, the signals on line 421 and on the byte control line in lines 419 have a first state. A signal on a write line in lines 419 has a second state so that multiplexer circuit passes information from bus 460 to the lower byte of common memory data bus CDATA. Thus, since the signal on the byte control line has the first state, the information on the lower byte of bus 460 is driven on the lower byte of common memory data bus CDATA.

When the counter in wait state logic & counters circuit 402 times out and is restarted, the signals on lines 419 and 421 are driven to a second state that is different from the first state. In response to the signal on line 421, the state of the signal on common data bus pin CD[15] is changed and so the addressed memory location is the address on common memory address bus CDADDR plus one byte is driven.

The change in state of the signal on the byte control line in lines 419 to multiplexer circuit 404 causes multiplexer circuit 404 to pass the information on the upper byte of bus 460 to the lower byte of common memory data bus CDATA. Thus, each byte in a word on bus 460 is driven sequentially by multiplexer circuit 404 onto the lower byte of common memory data bus CDATA.

In the previous discuss, DSP core 201 accessed external data memory on the second DSP clock cycle. Two clock cycles are required because the same memory can be accessed for a program fetch and for a data bus cycle. However, DSP core 201 can also read or write to any one of the memory mapped I/O registers. However, DSP core 201 does not retrieve a program instruction from a memory mapped TIO register. Therefore, there is no conflict between a program fetch from an internal or external memory and a data read or write to a memory mapped I/O register. Thus, in response to an input address to address decoder circuit 401 for a memory mapped I/O register and either a read strobe signal or a write strobe signal, address decoder circuit 401 immediately generates either an active read signal or an active write signal on one of the lines in internal chip select lines 420 to the memory mapped I/O register specified by the input address. Address decoder circuit 401 also generates signals on lines 417 to multiplexer and buffer circuit 405 to pass information from common internal memory data bus DB to data bus PDP for a read operation and to pass information from data bus PDP to common internal memory data bus DB for a write operation. Notice that if DSP core 201 also does a program fetch from external memory on the same DSP clock cycle, there is no contention within memory controller 205.

On read operations, accesses to HDC memory 260 are always single byte and so the second byte transfer described above is not performed. The HDC must be configured in a non-multiplexed Intel bus mode. In reads from HDC memory 260, the most significant eight bits of a word are read as zero to save having to mask these bits through DSP code. Accesses to application memory 261 are also only a single byte for an eight-bit external common memory data bus, and a word wide for a sixteen-bit external common memory data bus.

Thus, as explained above, in the eight-bit external common memory data bus mode, the most significant pin CD[15]/BSEL of common memory data bus pins CD[15:00] functions as an additional byte address bit for byte accesses to the external memories. The specified number of wait states are generated for each byte access.

Memory controller 205 also programmably supports programming of external ROM 262, when ROM 262 is an EPROM or an EEPROM, by allowing the mapping of 8 Kword segments from the external program ROM address space into a programming window data space defined by addresses A000H-BFFFH in external ROM 262. To utilize this capability of memory controller 205, the PROM program mode select bit in the memory configuration register 410 (Table 5) is set to enable the mapping of one 8 Kword segment of external ROM program address space to the programming window data address space. Setting the PROM program mode select bit also forces memory controller 205 to do single byte reads and writes from the program window data address space when memory controller 205 is configured for an eight-bit external common memory data bus width.

When the PROM program mode select bit is set, the PROM program window select bits in memory configuration register 410 (Table 5) define which of eight possible 8 Kword segments of the external ROM program address space is mapped to the PROM programming window data space. In PROM programming mode, i.e, when the PROM program mode select bit is set, accesses to the programming window data space result in the value stored in the programming window data space being driven on the upper three common memory bus address lines CA[15:13]. Thus, the three most significant bits of the ROM address come from the PROM programming window value and the least significant thirteen bits are from the data address. Thus, there is no need to map the external ROM into a data space.

Once a segment is mapped, read and write operations can be performed to PROM 262 as though it were RAM in the data address space. Accesses to the PROM programming window data space are always either a single byte or a word, If memory controller 205 is configured for an eight-bit external common memory data bus width, accesses to the PROM programming window neither generate multiple byte bus accesses nor assemble/disassembly of bytes to/from words. This allows maximum flexibility for application code control of the programming process.

Selection of upper or lower byte access to the PROM programming window is under software control. A PROM program byte select bit in memory configuration register 410 controls the state of pin CD[15]/BSEL when memory controller 205 is configured for an eight-bit external common memory data bus. The multiplexing of data from bus 460 to common memory bus CDATA is controlled by the PROM byte select bit in this mode of operation. This allows a DSP program controlled access to both upper and lower byte addresses for 8-bit PROM programming. When the PROM program byte select bit is set, the upper byte is selected. The lower byte is selected when the PROM program byte select bit is cleared.

To fully program a PROM, the DSP program goes though each 8 Kword segment twice, once for the low bytes with the PROM program byte select bit cleared, and once for the high bytes with the PROM program byte select bit set. Since low and high bytes are multiplexed under control of the PROM program byte select bit, there is no need to perform any byte alignment shift operations while programming eight-bit devices. Byte wide write verify operations are simplified by having single byte reads from the program window address space result in duplicate byte data in both high and low destination register byte positions.

In addition, to controlling wait states and generating chip select signals, memory controller 205 generates the read and write pulses on lines CRead and CWrite, respectively, to the external memory. The timing requirements for the signals on common external memory bus 204 are illustrated in FIGS. 5 to 8.

In FIGS. 5 to 8, signal trace CA represents the signals on common memory address bus CADDR. Signal trace CD represents the signals on common memory data bus CDATA. Signal trace CRD represents the signal on common memory bus read strobe line CRead, and signal trace CWR represents the signal on common memory bus write strobe line CWrite. Signal trace xCS represents the chip select signal for the particular memory being accessed. In one embodiment, the system clock is a 40 MHz clock and so the bus clock is a 20 MHz clock. The various reference characters used in FIGS. 5 to 8 are defined in Table 9.

TABLE 9

External Memory Interface Timing Specifications

| Name | FIG. | Description | Min. | Max. | Units |
|------|------|-------------|------|------|-------|
| Tcav | 5–8 | Common Address Valid | | 12 | ns |
| Tcah | 5–8 | Common Address Hold | 0 | | ns |
| Tcrv | 5, 7 | Common Read Valid | T | T + 7 | ns |

TABLE 9-continued

External Memory Interface Timing Specifications

| Name | FIG. | Description | Min. | Max. | Units |
|---|---|---|---|---|---|
| Tcrh | 5, 7 | Common Read Hold | 0 | 6 | ns |
| Tcwv | 6, 8 | Common Write Valid | | T + 7 | ns |
| Tcwh | 6, 8 | Common Write Hold | 0 | 6 | ns |
| Tccsv | 5–8 | Chip Select Valid | | 15 | ns |
| Tccsh | 5–8 | Chip Select Hold | 0 | | ns |
| Tcdf | 5–8 | Common Data Floating | 0 | 4 | ns |
| Tcdnf | 6, 8 | Common Data Not Floating | T − 1 | T + 3 | ns |
| Tcdv | 6, 8 | Common Data Valid | | T + 17 | ns |
| Tcdh | 6, 8 | Common Data Hold | 0 | | ns |
| Tcdis | 5, 7 | Common Data In Setup | 22 | | ns |
| Tcdih | 5, 7 | Common Data In Hold | 0 | | ns |

In one embodiment, memory controller 205 supports an internal trace mode to support debugging. To enable the internal trace mode, the internal debug mode enable bit in the chip configuration (Table 10) is set. In this embodiment, DSP core 201 is driven by an internally generated two phase (PHI1, PHI2) non-overlapping clock that is generated by dividing the system clock by two. When internal trace mode is enabled, two internal memory control signals, i.e, phase two of the DSP clock PHI2, and the program memory bus read strobe signal on line PRRMP, are driven to external pins PH2 and INPRD, respectively, of integrated circuit 150. Also, when internal trace mode is enabled, common memory bus address pins CA[15:00] are driven by the address signals on program memory address bus PPAN and common memory data bus pins CD[15:00] are driven by the data on program memory data bus IDP on all internal DSP program accesses. By edge triggering a logic analyzer on the negative edge on pin PH2 while in internal trace mode and using the read strobe signal on pin INPRD as a qualifier, all internal program memory references can be traced.

The control signals for shadow interrupt vector registers 310, sometimes referred to as shadow vector registers 310, are also generated in memory controller 205. Use of shadow vector registers 310 is enabled by setting the shadow vector enable bit in the chip configuration register (Table 10). If the shadow vector enable bit is not set, shadow vector registers 310 are both readable and writable through DSP data bus 203. The reserved locations in shadow vector registers 310 in the data memory address space as defined in Table 1 are read as zero in this case. If the shadow vector enable bit is set, shadow vector registers 310 are not accessible from DSP data bus 203.

When shadow vector registers 310 are disabled, i.e, are accessible on DSP data bus 203, a program access to the lower sixteen words of program ROM 223 generates a program ROM chip select signal and the data is sourced from program ROM 223. Conversely, if shadow vector registers are enabled, a program access to any one of the lower 16 words of program ROM 223 generates a shadow vector chip select signal on line 321 and the data is sourced from shadow vector registers 310.

Table 10 is one embodiment of the chip configuration register. In Table 10, only the bits used in this invention are defined. Also, a question mark in the reset column means that the reset state is user selectable by connecting a jumper to a pulldown resistor for a corresponding common memory bus address pin.

TABLE 10

Chip Configuration Register (CHPCFG)

| Bit(s) | rw | Reset | Description |
|---|---|---|---|
| 15 | r | ? | Not used in this invention |
| 14:13 | r | ? | Not used in this invention |
| 12:10 | r | ? | Not used in this invention |
| 09 | r | 0 | Reserved - - this bit reads as zero. |
| 08 | rw | 0 | Internal debug mode enable |
| 07 | rw | ? | BMODE - - external common memory bus mode. |
| 06:05 | rw | ? ? | Chip ID -- These bits determine the chip ID to which the chip responds through the host interface. The bits are sampled on the rising edge of reset (bits CA[1:0]) to determine the ID. Writing these bits with a new value changes the ID. |
| 04 | rw | 0 | Shadow Vectors Enable |
| 03 | rw | 0 | DIAGEN - - Used to enable diagnostic data output port pins. |
| 02:01 | rw | 0 | Reserved - - this bit reads a zero. |
| 00 | rw | 0 | HDC chip select polarity. Writing a one to this bit causes integrated circuit 150 to generate an active high HDC chip select signal. An active low HDC chip select signal is defined by default. |

On the rising edge of a reset signal, common memory bus address pin CA[2] in common memory bus address pins CA[15:0] is sampled to determine whether to set the BMODE bit. By default, the BMODE bit is set and memory controller 205 comes up in 8-bit external data bus mode because integrated circuit 150 has an internal pull-up on common memory address pin CA[2], as do all of the other common memory bus address and data pins. Conversely, if common memory address pin CA[2] is grounded on reset, the EMODE bit is set to zero and so memory controller 205 is configured for a sixteen-bit external common memory data bus.

Figure 9A:
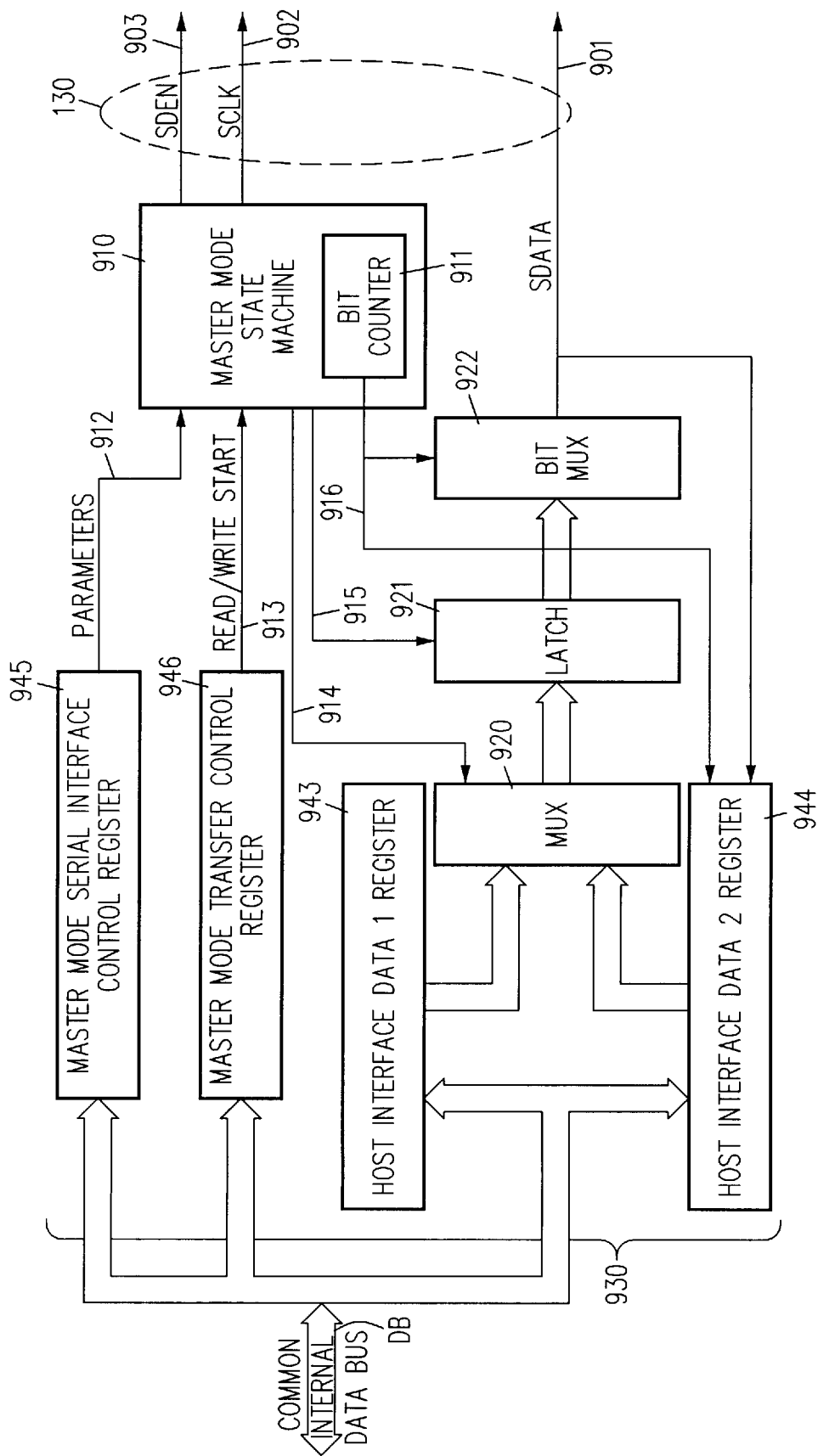
FIGS. 9A and 9B are a block diagram of peripheral port 100 of this invention where
Figure 9B:
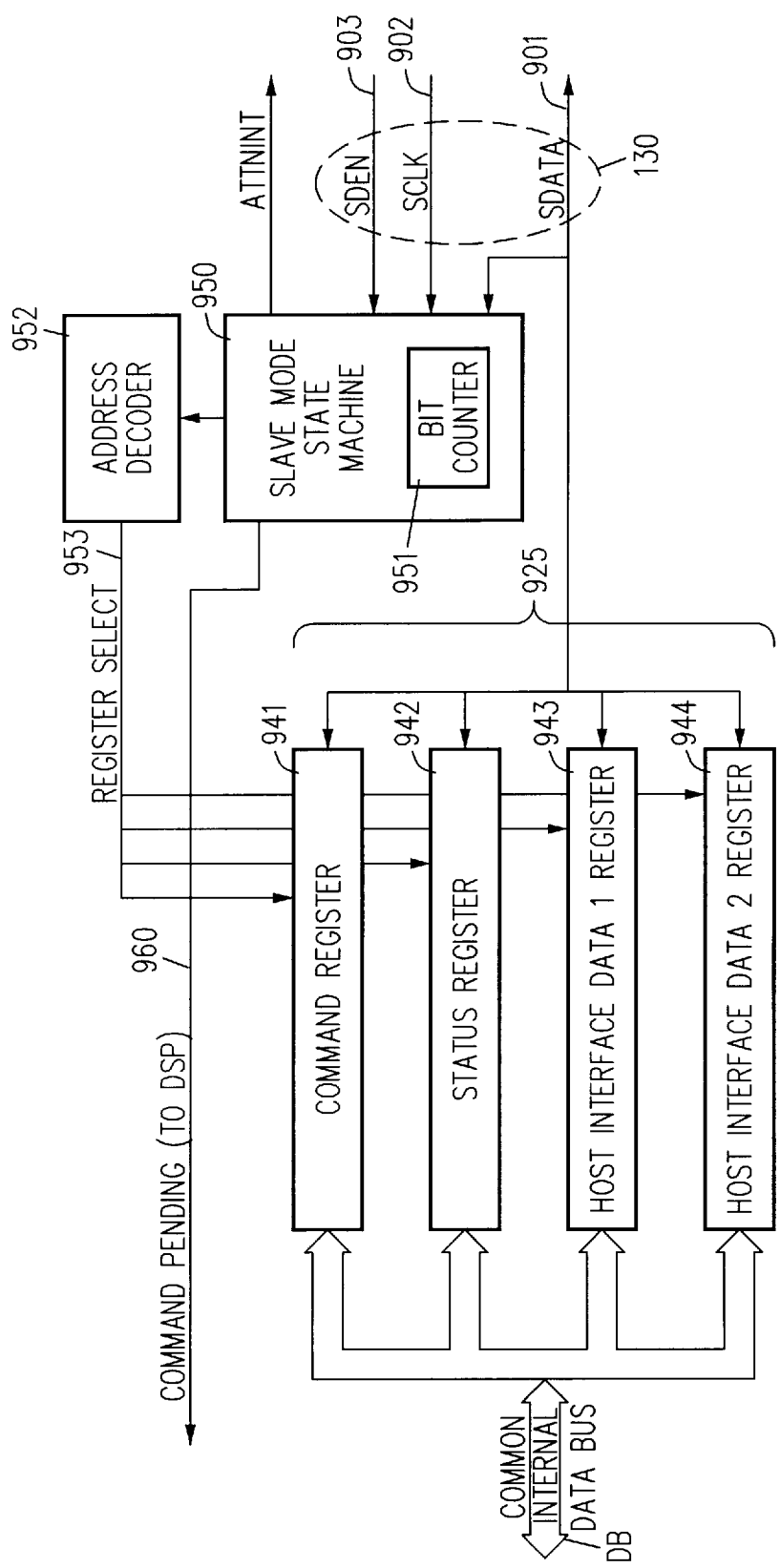

FIGS. 9A and 9B are a more detailed block diagram of peripheral port 100 that illustrate the master mode circuit and the slave mode circuit used in the two modes of operation of integrated circuit 150. Each register and other line or component in FIGS. 9A and 9B that has the same reference numeral is the same part and not two different parts with the same reference numeral. For example, registers 943 and 944 are shown in both figures even though there is only one register 943 and one register 944 in peripheral port 100.

All registers in peripheral port 100 are memory mapped I/O registers. Each register of registers 941 to 946 receives an individual read enable and an individual write enable on lines 420 from address decoder circuit 401. For convenience, these lines are not illustrated in FIGS. 9A and 9B. Register set 925 is used in the slave mode, while register set 930 is used in the master mode.

In master mode, serial data signal SDATA on line 901 is bi-directional, while serial data enable signal SDEN on line 903 and serial clock signal SCLK on line 902 are output signals from peripheral port 100. In master mode, DSP core 201 uses serial interface control register 945 and transfer control register 946 to define the signals transmitted over serial port 130 and to control whether the data transfer is a read or a write. In one embodiment, as described more completely below, the polarity of serial clock signal SCLK, the data shift direction, the polarity of serial data enable signal SDEN, the command packet length, and the data packet length are configured through serial interface control register 945 in the master mode.

DSP core 201 loads a command in first host interface data register 943. Peripheral port 100 shifts the command onto line 901 and drives signal SCLK on line 902 after signal SDEN is driven active, in one embodiment. If DSP core 201 is writing data to an external circuit, e.g., a peripheral device, the data is loaded into second host interface data register 944 and subsequently shifted out by serial clock signal SCLK immediately after the command in data register 943 is shifted out. Conversely, if DSP core 201 is reading data from an external circuit, the data is shifted into data register 944 by serial clock signal SCLK a predetermined interval after the command in data register 943 is shifted out. Hence, in master mode, signal SDATA on line 901 is bidirectional, while clock signal SCLK on line 902 and signal SDEN or line 903 are output signals.

To configure peripheral port 100 for master mode operation, DSP core 201 sets a master mode enable bit in serial interface control register 945, that is described more completely below. Upon reset, master mode enable bit is not set, and so by default, peripheral port 100 is configured in slave mode. In addition, to setting the master mode enable bit, DSP core 201 can configure peripheral port 100 for communications with a particular external circuit. Since the serial interfaces of the external circuits can vary widely, this capability facilitates using integrated circuit 150 with a wide variety of external circuits.

Specifically, DSP core 201 writes to serial interface control register 945 that is a memory mapped I/O registers on internal common memory data bus DB. One embodiment of serial interface control register 945 is given in Table 11.

TABLE 11

Master Mode - Serial Interface Control Register (MSTCTL)

| Bit(s) | rw | Reset | Field |
|---|---|---|---|
| 15 | rw | 0 | MSB first bit |
| 14 | rw | 0 | SCLOCK polarity bit |
| 13 | rw | 0 | SDEN polarity bit |
| 12 | rw | 0 | SDEN disable bit |
| 11 | r | 0 | Read turnaround mode bit |
| 10 | rw | 0 | Peripheral port GPIO enable bit |
| 09 | rw | 0 | Peripheral port master enable bit |
| 08 | rw | 0 | Command packet enable bit |
| 07:04 | rw | 0000 | Command packet length in bits |
| 03:00 | rw | 0000 | Data packet length in bits |

The state of the MSB first bit, bit 15, in register 945 determines the sequence of the data shifted out on line 901 in master mode. When the MSB first bit is set to a one, the most significant bit (MSB) in the register is shifted out as the first bit and conversely, the least significant bit is shifted out as the first bit when the MSB first bit is not set.

The state of the SCLOCK polarity bit, bit 14, in register 945 determines the edge of serial clock signal SCLK that is used to shift data out of peripheral port 100. When the SCLOCK polarity bit is set, the data is shifted out on line 901 on the rising edge of clock signal SCLK. The slave clocks the data-in on the falling edge of clock signal SCLK when the SCLOCK polarity bit is set.

The state of the SDEN polarity bit, bit 13, in register 945 determines the active state of serial data enable signal SDEN on line 903. When the SDEN polarity bit is set, serial data enable signal SDEN is active high to the slave, and conversely.

The state of the SDEN disable bit, bit 12, controls whether serial data enable signal SDEN is asserted during a serial data transfer. When the SDEN disable bit is not set, serial data enable signal SDEN is not asserted during a serial transfer, and conversely.

The state of the read turnaround mode bit, bit 11, controls whether one DSP clock cycle is inserted between transmission of a read command and receipt of the first bit of data to allow time for turnaround of the circuitry in the slave circuit. If the read turnaround mode bit is asserted, no delay is inserted between the last bit of the command and the first bit of the data and conversely.

The state of the peripheral port GPIO enable bit, bit 10, in register 945 determines whether peripheral port pins SCLK, SDATA, and SDEN become GPIO pins controlled through the two GPIO registers in GPIO circuit 119. When the peripheral port GPIO enable bit is set, peripheral port pins SCLK, SDATA, and SDEN become GPIO pins and conversely. On reset, this bit is not set and so DSP core 201 must set this bit only if peripheral port 100 is not being utilized.

The operation of the peripheral port master enable bit, bit 9, was described above.

When the command packet enable bit is set, the shifting out of the command packet portion of a serial transfer is enabled and conversely. The command length bits in the command length field, bits 4 to 7, define the number of bits in the command that are shifted out of register 943 when the command packet enable bit is set. In this embodiment, the number of command bits shifted out is the value of bits 4 to 7 plus one.

The data length bits in the data length field, bits 0 to 3, in register 945 define the number of data bits shifted out of register 944. In this embodiment, the number of data bits shifted out is the value of bits 0 to 3 plus one.

After DSP core 201 has configured serial interface control register 945 for master mode operation and the particular serial interface of the external circuit, DSP core 201 writes a command to register 943 and if DSP core 201 is writing to the external circuit, DSP core 201 writes the data to register 944. Data written to either register 943 or register 944 should be left justified.

Figure 10:
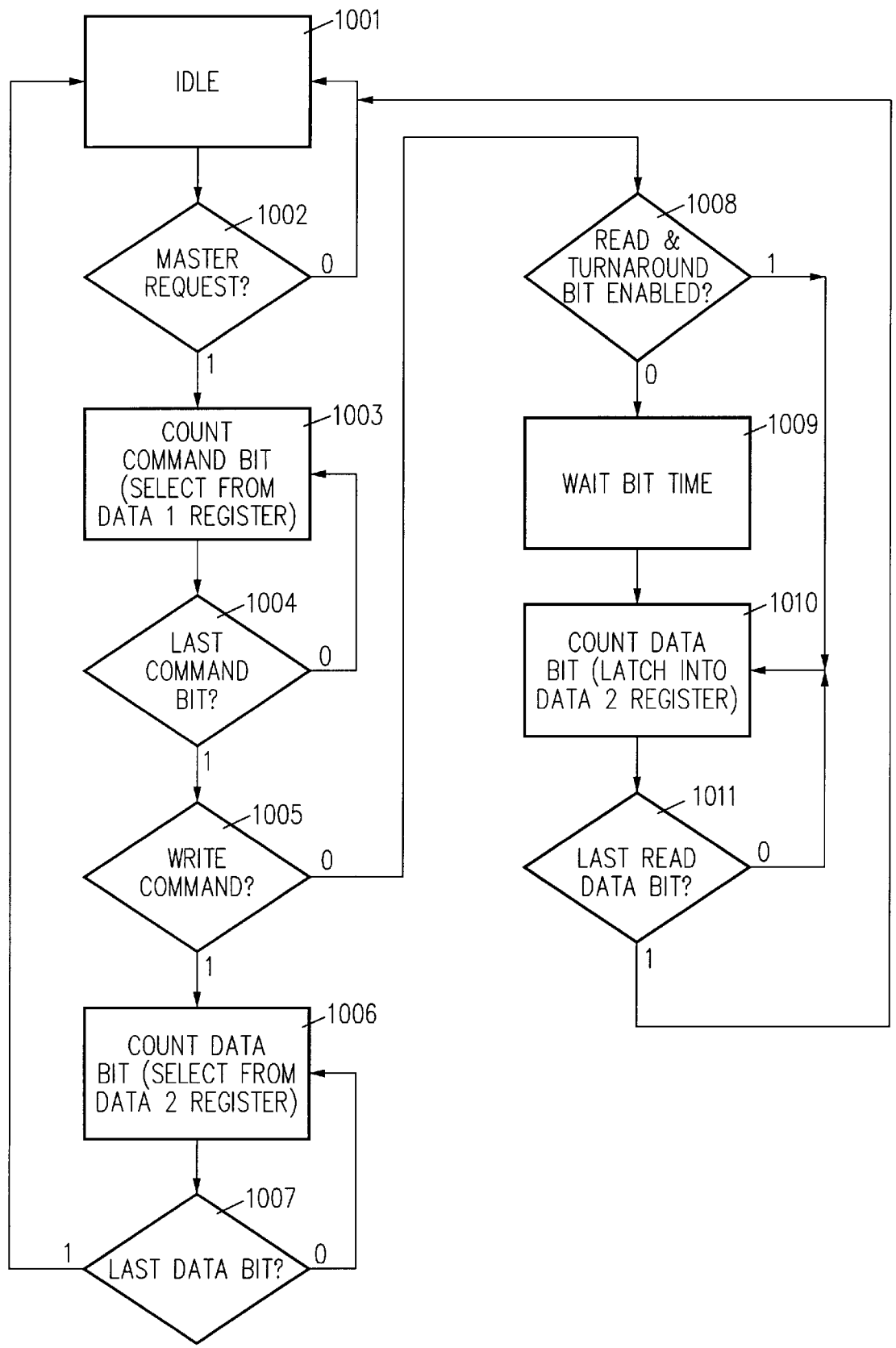
FIG. 10 is a state diagram for the master mode state machine of FIG. 9A.

Initially, master mode state machine 910 receives the parameters loaded into serial interface control register 945 over parameter lines 912 and master mode state machine 901 is in an idle state 1001 (FIG. 10). In idle state 1001, master mode state machine 901 holds serial clock line SCLK on line 902, serial data signal SDATA on line 901 and serial data enable signal SDEN on line 903 inactive.

DSP core 201 initiates a master mode transaction by writing to a master mode transfer control (MMTCTL) register 946. One embodiment of MMTCTL register 946 is given in Table 12.

TABLE 12

Master Mode Transfer Control Register (MMTCTL)

| Bit(s) | rw | Reset | Description/Function |
|---|---|---|---|
| 15:01 | w | | Reserved |
| 00 | w | | Master mode transfer control bit |

DSP core 201 writes a one to bit zero of MMTCTL register 946 to start a write transaction, and writes a zero to bit zero to start a read transaction. Upon a write to MMTCTL register 946, an active signal is generated on read/write start line 913 to master mode state machine 910. In idle state 1001, master mode state machine 910 performs master request check 1002 on every DSP clock cycle. If master request check 1002 senses an active signal on read/write start line 913, and both the peripheral port master enable bit and the command packet enable bit are set in serial interface control register 945, processing transitions from idle state 1001 to count command bit state 1003 and otherwise to idle state 1001.

Thus, upon a write to peripheral port 100 by DSP core 201, master mode state machine 910 transitions to count command bit state 1003. On the transition to count command bit state 1003, master mode state machine 910 loads the value in the command length bits in serial interface control register 945 into bit counter 911. Master mode state machine 910 also generates a signal on mux select line 914 to multiplexer 920 so that multiplexer 920 passes therethrough the information in register 943 in parallel to latch circuit 921. Master mode state machine 910 generates a signal on line 915 to enable latching of the information passed through multiplexer 920 in latch circuit 915.

The subsequent operations of master mode state machine 910 depend upon the configuration of the bits in serial interface control register 945. If the serial data disable bit is not set, master mode state machine 910 drives an active signal on serial data enable line SDEN, where the active polarity is defined by the serial data enable polarity bit in register 945. Master mode state machine 910 then drives a serial clock signal on line 902 and enables bit multiplexer 922 so that the first bit of the command is driven on serial data line 901 on the clock edge on serial clock line 902. The first bit transferred by bit multiplexer 922 is determined by the state of MSB first bit in register 945 and the clock edge is determined by the serial clock polarity bit in register 945. When shifting a command packet out of peripheral port 100 starting with the MSB first, shifting begins at the bit position specified in the command packet length field of register 945, and works towards bit zero. When shifting the command packet out starting with the LSB first, shifting begins with bit zero and works up to the bit position specified by the command packet length field.

Bit counter 911 counts each command bit transferred through bit multiplexer 922. As a command bit is transferred, count command bit state 1003 performs last command bit check 1004. If there are remaining bits in the command to transfer, processing remains in count command bit state 1003 and the next bit in the command is driven on serial data line SDATA.

When the last command bit is transferred, last command bit check 1004 is satisfied and so count command bit state 1003 performs write command check 1005. In write command check 10051 master mode state machine 910 determines whether the master mode transfer control bit in MMMTCL register 946 indicates a read or a write operation. If the master mode transfer control bit is not set, processing transfers from count command bit state 1003 to count data bit state 1006 for the write operation and otherwise to read and turnaround bit enabled check 1008.

In the transfer to count data bit state 1006, bit counter 911 is loaded with the number of data bits in the data packet to be transferred out of peripheral port 100. Master mode state machine 910 also generates a signal on mux select line 914 to multiplexer 920 so that multiplexer 920 passes therethrough the information in register 944 in parallel to latch circuit 921. Master mode state machine 910 generates a signal on line 915 to enable latching of the information passed through multiplexer 920 in latch circuit 915 so that on the first edge of serial clock signal SCLK on line 902 following clocking out of the last command bit, the first bit of the data packet is clocked onto serial data line 901 from bit multiplexer 922.

The first data bit transferred by bit multiplexer 922 is determined by the state of MSB first bit in register 945 and the clock edge is determined by the serial clock polarity bit in register 945, as described above for the command packet. When shifting a data packet out of peripheral port 100 starting with the MSB first, shifting begins at the bit position specified in the data packet length field of register 945, and works towards bit zero. When shifting the data packet out starting with the LSB first, shifting begins with bit zero and works up to the bit position specified by the data packet length field.

Bit counter 911 counts each data bit transferred through bit multiplexer 922. As a data bit is transferred, count data bit state 1006 performs last write data bit check 1007. If there are remaining data bits to transfer, master mode state machine 910 remains in count data bit state 1006, and the next data bit is driven on serial data line 901.

When the last data bit is transferred, last write data bit check 1007 is satisfied and so master mode state machine 910 transitions from count data bit state 1006 to idle state 1001. In the transition, master mode state machine 910 sets a master mode transfer complete bit, that is multiplexed with a command pending bit that is used in slave mode, in an interrupt pending register INTPND of DSP core 201 and generates an interrupt to DSP core 201. The interrupt is cleared by DSP core 201 either by writing a one to the location of the master mode transfer complete bit in interrupt pending register INTPND, or by any access to MMTCTL register 946, register 943, or register 944. In the transition, master mode state machine 910 also drives the serial data enable signal SDEN inactive.

In the previous discussion, it was assumed that the master mode transfer control bit was not set and so a write to a slave circuit was desired. However, if the master mode transfer control bit is set, a read from a slave circuit is desired. In this case, write command check 1005 transfers control to read and turnaround bit enabled check 1008 following transmission of the command packet.

If the read and turnaround bit is enabled in serial interface control register 945, master mode state machine transfers to count data bit state 1010 and otherwise to wait bit time state 1009. To avoid contentions on read transfers, one cycle of serial clock SCLK is inserted between the last bit of the control packet shifted from peripheral port 100 and the first bit of the data packet shifted into register 944 from the peripheral device in wait bit time state 1109. This is only true for reads. Serial writes, as indicated above, do not have the extra clock cycle between the control packet and data packet because both are driven from peripheral port 100. After the one serial clock cycle, wait bit time state 1009 transitions to count data bit state 1010

In the transfer to count data bit state 1010, bit counter 911 is loaded with the number of data bits in the data packet to be received in peripheral port 100. Master mode state machine 910 also generates a signal to enable serial shifting of data into register 944 from serial data line 901.

In count data bit state 1010, the first bit of the data packet is shifted into register 944. The read data is shifted into the complement bit to the shift direction, e.g., if shifting starts with the MSB first, data is shifted into the LSB of register 944. If shifting starts with the LSB first in the read operation, data is shifted into the bit position specified by the data packet length field in register 945.

Bit counter 911 counts each bit transferred into register 944. As a bit is transferred, master mode state machine 910 performs last read data bit check 1011. If there are remaining data bits to transfer, processing remains in count data bit state 1010 and the next data bit is received from serial data line 901.

When the last data bit is transferred into register 944, last read data bit check 1011 is true and master mode state machine 910 transfers from count data bit state 1010 to idle state 1001. In the transition, master mode state machine 910 sets the master mode transfer complete bit and generates an interrupt to indicate that register 944 contains a data packet. In the transition, master mode state machine 910 also drives the serial data enable signal SDEN inactive.

Thus, immediately following the start of a transaction, peripheral port 100 shifts out the command packet previously loaded into register 943. After the command packet has been transferred, the data packet is either shifted out of or into register 944 depending on whether the transaction was a read or a write.

Figure 11A:
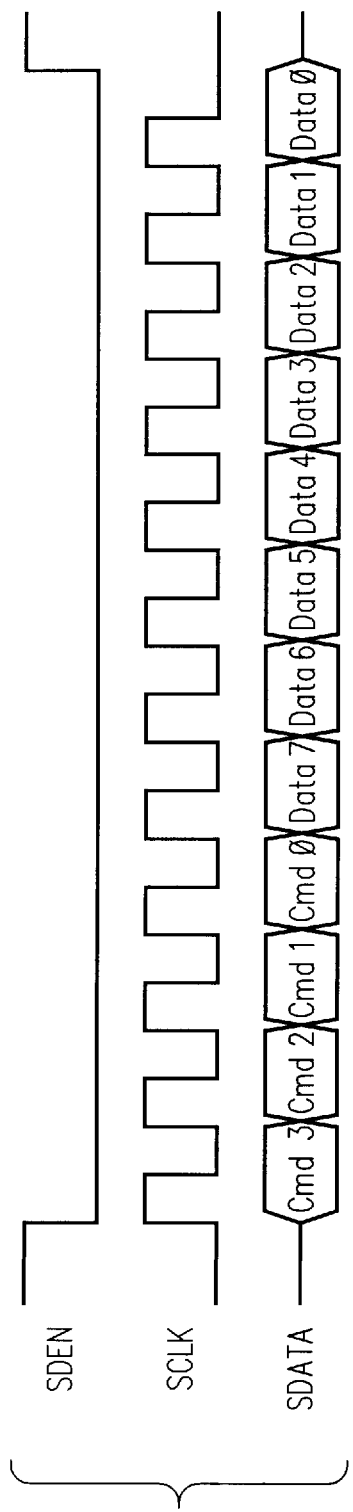
FIG. 11A and 11B are timing diagrams for one embodiment of a master mode write and read, respectively according to the principles of this invention.
Figure 11B:
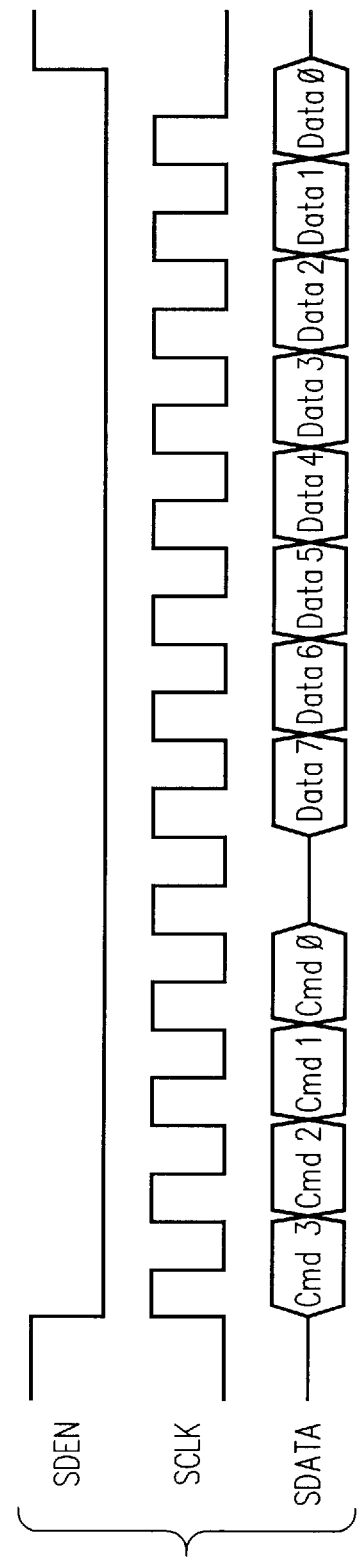

FIGS. 11A and 11B are examples of a master mode write and read cycles, respectively. For the command packet size and the data packet size shown in FIGS. 11A and 11B, DSP core 201 programs register 945 so that: the MSB first bit is set; the SCLOCK polarity bit is set; the SDEN polarity bit is zero; the peripheral port master enable bit is set; the command packet enable bit is set; the command length field is set to 0011; and the data length field is set to 0111.

Serial data enable signal SDEN goes low, i.e, active, on or before the rising edge of serial clock signal SCLK of the first bit transferred. In this embodiment, serial clock signal SCLK can have a maximum frequency of 20 MHz. Each bit is shifted out on the rising edge of serial clock signal SCLK. Note that in FIG. 10B, there is a one clock cycle delay between the transmission of the last bit in the command packet and the clocking in of the first bit of the data packet because the read turnaround mode bit is cleared.

When peripheral port 100 is in slave mode, communication between a host microcontroller (not shown) and peripheral port 100 occurs through a set of mailbox registers 925 (FIG. 9B) that are on internal common memory data bus DB. Communication through the set of mailbox registers 925 gives the host microcontroller indirect access to the entire internal address space of DSP core 201. In this embodiment, the set of mailbox registers 925 includes four sixteen-bit registers 941 to 944 (FIG. 9B) within the data address space of DSP core 201 that are dual-ported with eight 8-bit registers in the address space of peripheral port 100. These registers are a sixteen-bit command register 941; a sixteen-bit status register 942; a first sixteen-bit host interface data register 943; and a second sixteen-bit host interface data register 944. Registers 943 and 944 appear to the host microcontroller as four 8-bit registers and to DSP core 201 as two 16-bit registers.

In slave mode, the host microcontroller first transmits a control byte to slave mode state machine 950 and address decoder 952 by driving serial data enable signal SDEN on line 903 active, and then clocking serial data SDATA over serial data line 901 by a serial clock signal SCLK on serial clock line 902. As explained more completely below, the control byte identifies whether the host microcontroller is reading or writing data, identifies integrated circuit 150, identifies the address of the mailbox register to write to, or read from, e.g., the byte or word within data registers 943 and 944, and specifies the unit of size for the data, e.g, byte or word.

In response to the control byte, slave mode state machine 950 configures peripheral port 100 to receive data in or transmit data from the addressed mailbox register. The data is transmitted in the appropriate direction over serial data line 901 in response to serial clock signal SCLK on serial clock line 902.

As explained above, the mode of peripheral port 100 is controlled by the master mode enable bit in serial interface control register 945. Upon reset, master mode enable bit is not set, and so by default, peripheral port 100 is configured in slave mode.

In slave mode, slave mode status register 942 gives the host microcontroller access to the operating status of integrated circuit 150. The information in register 942 is considered prior to considering the slave mode further because some of the information determines whether operations in the slave mode proceed. One embodiment of slave mode status register 942 is given in Table 13.

TABLE 13

Slave Mode Status Register 942

| Bit(s) | rw | Reset | Description |
|--------|----|----|-------------|
| 15:08 | rw | 000h | Software Status |
| 07:05 | r | 0 | User Status Flags <2:0> |
| 04 | r | 0 | Write Unsafe |
| 03 | r | 1 | Target Compare |
| 02 | r | 0 | Qualified Write Gate |
| 01 | r | 0 | Host Interrupt |
| 00 | r | 0 | Busy |

As shown in Table 13, the lower byte of slave mode status register 942 contains five dedicated status bits and three user status flags. Bit 0, the busy bit, is used for flow control, as described more completely below. DSP core 201 clears the busy bit by driving the address of a clear busy bit register on data address bus PDAN and generating a strobe signal on data write line PWRMP. In response, to these signals, address decoder circuit 401 generates an active signal on a write enable line to the clear busy bit register in internal chip select lines 420. The active signal on the write enable line to the clear busy bit register sets the clear busy bit register which in turn clears the busy bit in slave mode status register 942.

Bit 1, the host interrupt bit, is set when the program executed by DSP core 201 wants to generate a host interrupt to the host microcontroller. Specifically, DSP core 201 writes to a set hit register by driving the address of the set hit register on data address bus PDAN and generating a strobe signal on data write line PWRMP. In response to these signals, address decoder circuit 401 generates an active signal on a write enable line to a set hit register in internal chip select lines. The active signal on the write enable line to the set hit register sets the set hit register which in turn sets the host interrupt bit in slave mode status register 942 and drives an active signal on host interrupt pin ATTNINT/RAMCS which is configured as a host interrupt pin in slave mode. Typically, an interrupt is generated upon completion of a task, such as a track seek operation or a head switch operation, or upon detection of an error condition. The host interrupt bit is cleared when the host microcontroller reads the low byte of slave mode status register 942.

Bits 2 to 4 in slave mode status register 942 give the host microcontroller access to the hardware status of integrated circuit 150. Specifically, bit 2, the qualified write gate bit, is set by the programmable servo decoder 113. Similarly, bit 3, the target compare bit is set when the value of a grey code register is equal to the value in the target address register. Both of these registers are also in the programmable servo decoder 113. One embodiment of these registers and their operation is described in copending and commonly assigned U.S patent application Ser. No. 08/293,981, entitled "A Programmable Servo Burst Decoder" of Nicolas C. Assouad et al. filed on Aug. 22, 1994. Bit 4, the write unsafe bit, is set when any unsafe write condition is detected.

Bits 5 to 7 are user status flags available for use by software executed by DSP core 201. Specifically, to set user status flag zero bit, DSP core 201 writes to a set user status flag zero register by driving the address of the set user status flag zero register on data address bus PDAN and generating a strobe signal on line PWRMP. In response to the address and the strobe signal, address decoder circuit 401 generates a write signal on a line in internal chip select lines 420 to the set user status flag zero register. The write signal sets set user status flag zero register, which in turn sets the user status flag zero bit, bit 5. To clear user status flag zero bit, DSP core 201 writes to a clear user status flag zero register which in turn results in user status flag zero bit being cleared.

Similarly, to set bit 6, DSP core 201 writes to a set user status flag one register, and to clear bit 6, DSP core 201 writes to a clear user status flag one register. To set bit 7, DSP core 201 writes to a set user status flag two register, and to clear bit 6, DSP core 201 writes to a clear user status flag two register.

The upper byte of slave mode status register 942 is available for use by software being executed by DSP core 201. DSP core 201 writes to the upper byte of status register 942 only when bit BUSY is set. Table 14 is one embodiment of registers in peripheral port 100 that are utilized with status register 942 to clear and set various bits in status register 942 as described above.

TABLE 14

Slave Mode - Status Bits Set/Clear Registers

| Bit(s) | rw | Reset | Description/Function |
|---|---|---|---|
| 15:00 | w | xxxxh | CLRBSY -- Write clears Busy Bit. |
| 15:00 | w | xxxxh | SETHIT -- Write generates Host Interrupt |
| 15:00 | w | xxxxh | CLUSF0 -- Write clears User Status Flag 0 |
| 15:00 | w | xxxxh | STUSF0 -- Write sets User Status Flag 0 |
| 15:00 | w | xxxxh | CLUSF1 -- Write clears User Status Flag 1 |
| 15:00 | w | xxxxh | STUSF1 - Write sets User Status Flag 1 |
| 15:00 | w | xxxxh | CLUSF2 -- Write clears User Status Flag 2 |
| 15:00 | w | xxxxh | STUSF2 - Write sets User Status Flag 2 |

In slave mode, the host microcontroller can read the status of bit BUSY in status register 942 at any time to determine whether bit BUSY is deasserted. The host microcontroller accesses registers 941, 943 and 944 when bit BUSY is deasserted. If bit BUSY is deasserted, the host microcontroller first writes to either data register 943 or data register 944 or both, to the high byte of command register 941, and then writes the command itself, i.e., the primary command, in the low byte of command register 941.

Typically, the host microcontroller sends a control byte and data to write the two bytes of register 943 and possibly a control byte and data to the two bytes of register 944. Next host microcontroller sends a control byte and data to the high byte of command register 941. When the host microcontroller sends a control byte and data to write to the low byte of command register 941, a command pending complete bit is set which signals a new command is ready in peripheral port 100 by sending a command pending signal to interrupt logic of DSP core 201 on command pending line 960. Some typical commands might be spin-up, spin-down, seek to track X, read memory location X, write X to memory location Y.

DSP core 201 detects a pending command either by receiving an interrupt or by polling (either DSP register ST2, bit 11 or by a branch instruction with branch condition U11). The writing of a primary command to command register 941 by the host microcontroller also sets bit BUSY in status register 941. After DSP core 201 reads command register 941, the command-pending bit is cleared. DSP core 201 writes to the clear busy register CLRBSY to clear bit BUSY, as described above, when the processing of the command is complete and the mailbox registers are again available for use by the host microcontroller.

For example, DSP core 201 may write data in registers 943 and 944 to be subsequently read by the host microcontroller in response to a command and then clear bit BUSY. In slave mode, after the host microcontroller reads the status of bit BUSY in status register 942 and determines that bit BUSY is deasserted, the host microcontroller can read from either data register 943 or 944.

Specifically, after determining that bit BUSY is deasserted, the host microcontroller transmits a control byte to peripheral port 100. The next operation depends on the information in the control byte. The host microcontroller sends data to the peripheral port register identified in the control byte if the operation specified in the control byte is a write, or reads data from the peripheral port register if the operation specified in the control byte is a read.

To initiate transfer of the control byte, the host microcontroller first drives serial data enable signal SDEN active on serial data enable line 903 and generates serial clock signal SCLK on serial clock line 902. Serial data enable signal SDEN must go low, i.e, active, on or before the rising edge of serial clock signal SCLK of the first bit transferred. In this embodiment, serial clock signal SCLK can have a maximum frequency of 20 MHz.

Figure 12:
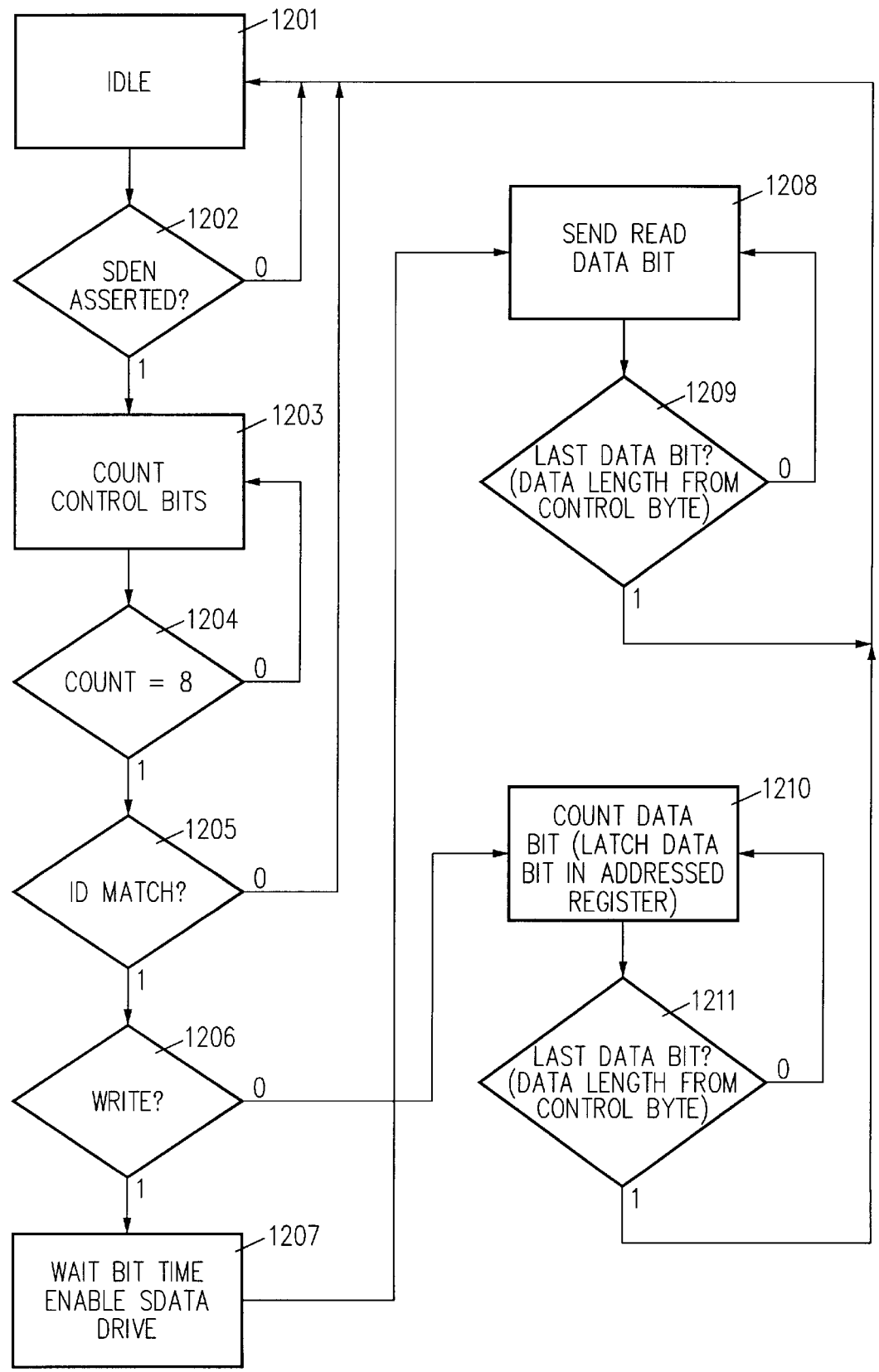
FIG. 12 is a state diagram for the slave mode state machine of Figure 9B.

Initially, slave mode state machine 950 (FIG. 9B) is in idle state 1201 (FIG. 12). In idle state 1201, slave mode state machine 950 performs SDEN asserted check 1202 on each serial clock cycle. If serial data enable signal SDEN on line 903 is active, slave mode state machine 950 transitions from idle state 1201 to count control bit state 1203 and otherwise remains in idle state 1201. Thus, when serial data enable signal SDEN goes active, slave mode state machine 950 transitions to count control bit state 1203.

In a write of the control byte to integrated circuit 150 as well as in general, the host microcontroller transmits the information starting with the most significant bit, and each bit in signal SDATA is driven on line 901 on the rising edge of serial clock signal SCLK. Signal SDATA is sampled by peripheral port 100 on the falling edge of serial clock signal SCLK. A format for the control byte is given in Table 15.

TABLE 15

Slave Mode - Host Interface Control Byte Definition

| Bit(s) | Field |
|---|---|
| 07 | R/W |
| 06:05 | ID |
| 04:01 | Address |
| 00 | Data Length |

As each bit of the control byte is clocked over line 901, the bit is loaded into slave mode state machine 950 and bit counter 951 is incremented. As a control bit is transferred, count control bit state 1203 performs control bit count check 1204. If all the control bits have been received, e.g., the count is eight, control bit count check 1204 is true and so ID match check 1205 is performed. If control bit count check 1204 is false, processing remains in count control bit state 1203 until control bit count check 1204 is true.

Hence, when slave state machine 950 has received the control byte, slave state machine 950 determines whether the control byte is intended for integrated circuit 150. Specifically, slave state machine 950 compares the identification (ID) bits of the control byte with the identification bits in the chip configuration register (Table 10) of integrated circuit 150. If the ID in the control byte matches the ID in the chip configuration register, processing transfers from ID match check 1205 to write check 1206 and otherwise to idle state 1201.

In write check 1206, slave mode state machine 950 determines whether the most significant bit in the control byte is set. If the read/write (R/W) bit is set in the control byte, the host microcontroller is reading the register specified by bits 04:01, i.e, the address field, of the control byte, and otherwise the host microcontroller is writing to the register specified by the address field.

The bits in the address field of the control byte are the address for one of the eight byte wide mailbox registers and are provided by slave mode state machine 950 to address decoder 952. Address decoder 952 determines which register is specified and enables the appropriate register for a read or a write by transmitting an active signal to the register over one of register select lines 953.

In this embodiment, the addresses of the eight byte wide mailbox registers are given in Table 16.

TABLE 16

Slave Mode - Host Mailbox Register Addresses

| Address | Register |
|---|---|
| x000 | Command - Primary (low byte register 941) |
| x001 | Command - Extended (high byte register 941) |
| x010 | Status - low byte register 942 |
| x011 | Status - high byte register 942 |
| x100 | Data 1 - low byte register 943 |
| x101 | Data 1 - high byte register 943 |
| x110 | Data 2 - low byte register 944 |
| x111 | Data 2 - high byte register 944 |

If the read/write (R/W) bit is set in the control byte, the host microcontroller is reading the register specified by the address field of the control byte. Thus, slave mode state machine 950 is writing to the host microcontroller and so processing transfers from write check 1206 to wait bit time state 1207.

Slave mode state machine 950 in state 1207 waits for one serial clock cycle to avoid contentions on line 901 and to allow time to enable driving of line 901. After one serial clock cycle, slave mode state machine 950 transitions to send read data bit state 1208. As each data bit is clocked from the addressed register to line 901 in send read data bit state 1208, bit counter 951 is incremented and slave mode state machine 950 performs last data bit check 1209.

In last data bit check 1209, slave mode state machine 950 compares the value of bit counter 951 with the size of the data transfer specified in the control byte. If bit 0, the data length bit, of the control byte is set, the data packet is 16-bits in length and otherwise, the data packet is 8-bits in length. When in 16-bit transfer mode, i.e, the data length bit is set, the least significant bit (bit 1 of the control byte) in the address field is ignored.

If all

If all of the data has been transferred from the specified register last data bit check 1209 is true and slave mode state machine 950 transitions from send read data bit state 1208 to idle state 1201 and otherwise remains in send read data bit state 1208 in which another data bit is transmitted to the host microcontroller.

Figure 13A:
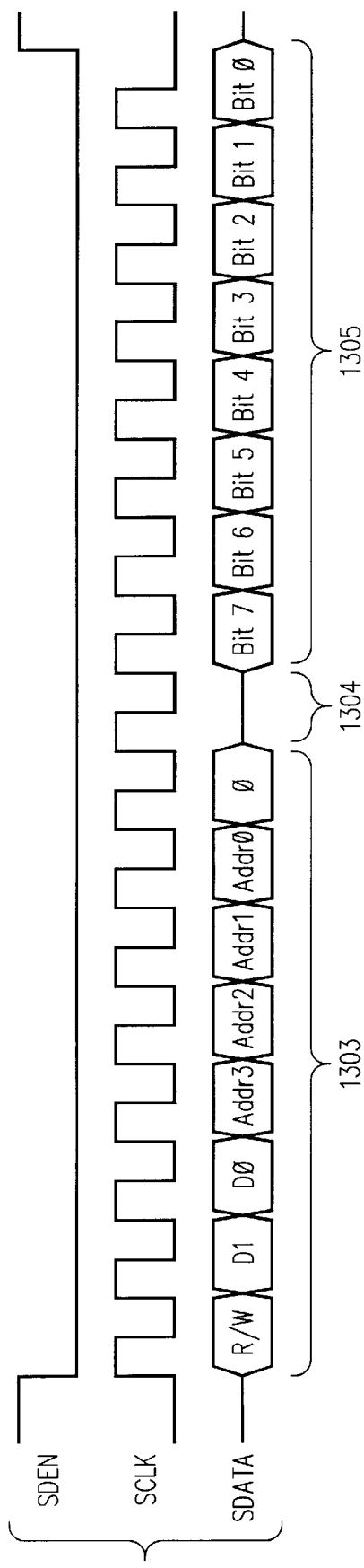
FIGS. 13A and 13B are timing diagrams for one embodiment of a slave mode read and write, respectively according to the principles of this invention.

As shown in FIG. 13A, the first eight bits transmitted in signal SDATA are control byte 1303, as described above, from the host microcontroller. After a one clock cycle delay 1304, data byte 1305 in the addressed register is clocked from peripheral port 100 to the host microcontroller. Typically, the host microcontroller issues a read command only after allowing DSP core 201 to respond to a command to write specific data in one of registers 943 and 944.

If the read/write (R/W) bit is not set in the control byte, the host microcontroller is writing the register specified by the address field of the control byte. Thus, processing transfers upon performance of write check 1206 from count control bit state 1203 to count data bit state 1210.

As each data bit is clocked to the addressed register from line 901 in count data bit state 1210, bit counter 951 is incremented and slave mode state machine 950 performs last data bit check 1211. In last data bit check 1211, slave mode state machine 950 compares the value of bit counter 951 with the size of the data transfer specified in the control byte. If bit 0, the data length bit, of the control byte is set, the following data pocket is 16-bits in length and otherwise, the following data pocket is 8-bits in length. When in 16-bit transfer mode, i.e, the data length bit is set, the least significant bit (bit 1 of the control byte) in the address field is ignored.

If all of the data has been transferred to the specified register, last data bit check is true and slave mode state machine 950 transitions from count data bit state 1201 to idle state 1201 and otherwise remains in count data bit state 1211 in which another data bit is transmitted from the host microcontroller. If the low byte of command register 941 is being written, slave mode state machine 950 sets bit BUSY and drives an active signal on command pending line 960, as described above.

Figure 13B:
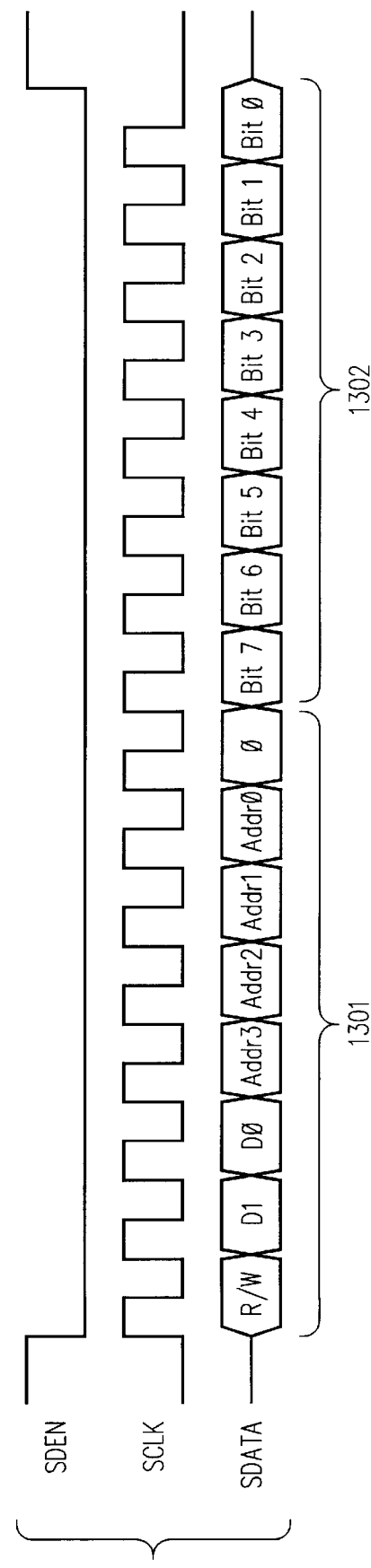

The signal trace in FIG. 13B is for a one byte write, and so the R/W bit of control byte 1301 is set and the data length bit is cleared. Notice that data byte 1302 follows control byte 1301 without any delay. When bit 0 of data byte 1302 is loaded into the addressed data register, serial date enable signal SDEN remains active on the falling edge of serial clock signal SCLK that is used to capture the last bit transferred, i.e, bit 0 of data byte 1302. If serial data enable signal SDEN is deasserted while a transfer is still in progress, peripheral port 100 aborts the transfer and resets for the next serial transfer.

Figure 14:
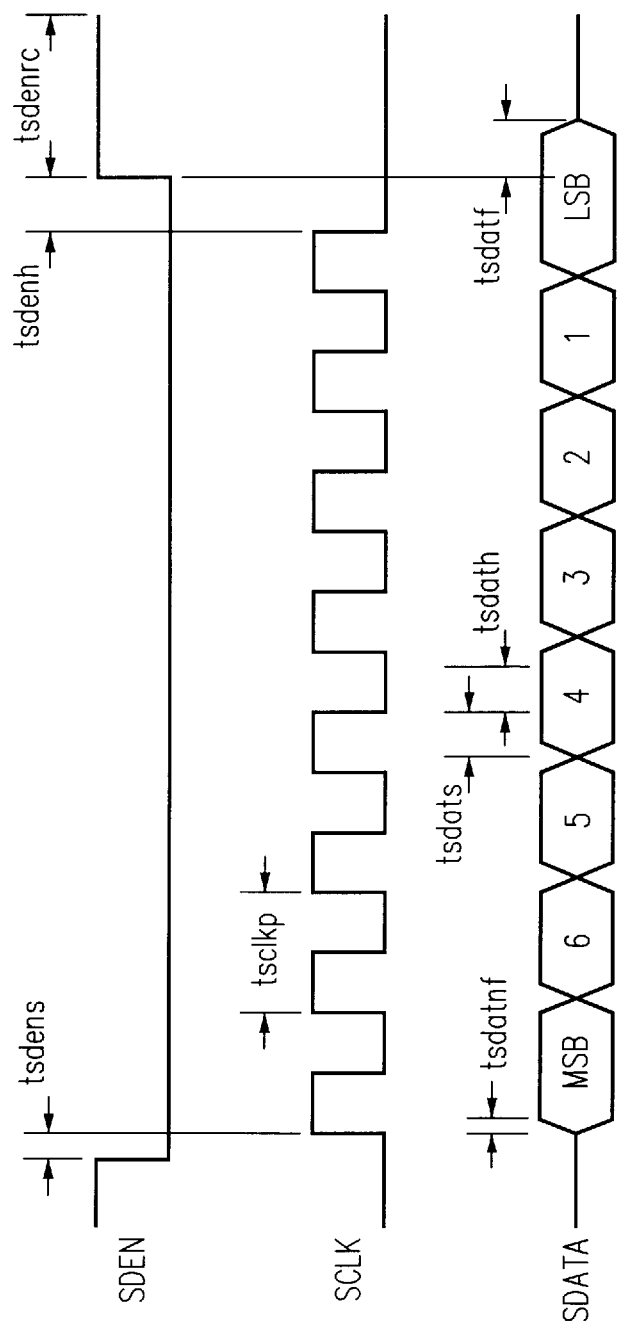
FIG. 14 is timing diagram for the serial port of peripheral port 100 showing the timing relationships between the serial port signals.

FIG. 14 illustrates the timing relationship between serial data signal SDATA, serial data enable signal SDEN, and serial clock signal SCLK. The reference characters in FIG. 14 are defined in Table 17.

TABLE 17

Peripheral Port Timing Specifications

| Name | FIG. | Description | Min. | Max. | Units |
|---|---|---|---|---|---|
| tsclkp | 14 | SCLK period | 50 | | ns |
| tsclkh | | SCLK high time | 25 | | ns |
| tsclkl | | SCLK low time | 15 | | ns |
| tsclkr | | SCLK rise time, load = 20 pF | | 5 | ns |
| tsclkf | | SCLK fall time, load = 20 pF | | 5 | ns |
| tsdens | 14 | SDEN setup time | 10 | | ns |
| tsdenh | 14 | SDEN hold time | 25 | | ns |
| tsdats | 14 | SDATA setup time | 5 | | ns |
| tsdath | 14 | SDATA hold time | 5 | | ns |
| tsdatf | 14 | SDATA floating time | | 20 | ns |
| tsdatnf | 14 | SDATA driven time | 0 | 20 | ns |
| tsdenrc | 14 | SDEN Recovery Time | 100 | | ns |

General purpose I/O circuit 119, in one embodiment includes fourteen general purpose input/output (GPIO) bits that are available to the user. Each GPIO bit is associated with a general purpose I/O (GPIO) pin. These bits are configured and accessed through two registers. A GPIOCL register controls, on a bit by bit basis, whether a bit is an input bit or an output bit. All fourteen bits default to input bits on reset. Setting a bit in the GPIOCL register changes that bit to an output bit and the corresponding general purpose I/O pin to an output pin. A GPIODT register is used to read the state of GPIO bits configured as input bits and set the state of GPIO bits configured as output bits. Thus, reading the GPIODT register returns the logic level on the GPIO pins. Writing the GPIODT register affects the logic level on only the GPIO pins configured as output pins by the bits in the GPIOCL register. GPIO bits 14–12 are multiplexed on peripheral interface pins SDATA, SCLK, and, SDEN. To use these GPIO pins as general purpose input/output pins, peripheral interface GPIO mode must be enabled in MSTCTL register (Table 11) by setting the peripheral port GPIO enable bit.

TABLE 18

GENERAL PURPOSE I/O CONTROL REGISTER (GPIOCL)

| Bit(s) | rw | Reset | Description/Function |
|---|---|---|---|
| 15 | r | 0 | Reserved |
| 14 | rw | 0 | GPIO Bit 14 Control -- 1 = output, 0 = input. This function is multiplexed with the SDATA pin. To enable this function, Peripheral Interface GPIO Mode must be enabled in the MSTCTL register. |
| 13 | rw | 0 | GPIO Bit 13 Control -- 1 = output, 0 = input. This function is multiplexed with the SCLK pin. To enable this function, Peripheral Interface GPIO Mode must be enabled in the MSTCTL register. |
| 12 | rw | 0 | GPIO Bit 12 Control -- 1 = output, 0 = input. This function is multiplexed with the SDEN pin. To enable this function, Peripheral Interface GPIO Mode must be enabled in the MSTCTL register. |
| 11 | rw | 0 | GPIO Bit 11 Control -- 1 = output, 0 = input |
| 10 | rw | 0 | GPIO Bit 10 Control -- 1 = output, 0 = input |
| 09 | rw | 0 | GPIO Bit 9 Control -- 1 = output, 0 = input |
| 08 | rw | 0 | GPIO Bit 8 Control -- 1 = output, 0 = input |
| 07 | rw | 0 | GPIO Bit 7 Control -- 1 = output, 0 = input |
| 06 | rw | 0 | GPIO Bit 6 Control -- 1 = output, 0 = input |
| 05 | rw | 0 | GPIO Bit 5 Control -- 1 = output, 0 = input |
| 04 | rw | 0 | GPIO Bit 4 Control 1 = output, 0 = input |
| 03 | rw | 0 | GPIO Bit 3 Control -- 1 = output, 0 = input |
| 02 | rw | 0 | GPIO Bit 2 Control -- 1 = output, 0 = input |
| 01 | rw | 0 | GPIO Bit 1 Control -- 1 =output, 0 = input |
| 00 | rw | 0 | GPIO Bit 0 Control -- 1 = output, 0 = input |

TABLE 19

GENERAL PURPOSE I/O DATA REGISTER (GPIODT)

| Bit(s) | rw | Reset | Description/Function |
|---|---|---|---|
| 15 | r | 0 | Reserved |
| 14 | rw | 0 | GPIO Bit 14. This function is multiplexed with the SDATA pin. To enable this function, Peripheral Interface GPIO Mode must be enabled in the MSTCTL register. |
| 13 | rw | 0 | GPIO Bit 13. This function is multiplexed with the SDATA pin. To enable this function, Peripheral Interface GPIO Mode must be enabled in the MSTCTL register. |
| 12 | rw | 0 | GPIO Bit 12. This function is multiplexed with the SDATA pin. To enable this function, Peripheral Interface GPIO Mode must be enabled in the MSTCTL register. |
| 11 | rw | 0 | GPIO Bit 11 |
| 10 | rw | 0 | GPIO Bit 10 |
| 09 | rw | 0 | GPIO Bit 9 |
| 08 | rw | 0 | GPIO Bit 8 |
| 07 | rw | 0 | GPIO Bit 7 |
| 06 | rw | 0 | GPIO Bit 6 |
| 05 | rw | 0 | GPIO Bit 5 |
| 04 | rw | 0 | GPIO Bit 4 |
| 03 | rw | 0 | GPIO Bit 3 |
| 02 | rw | 0 | GPIO Bit 2 |

TABLE 19-continued

GENERAL PURPOSE I/O DATA REGISTER (GPIODT)

| Bit(s) | rw | Reset | Description/Function |
|--------|----|-------|----------------------|
| 01     | rw | 0     | GPIO Bit 1           |
| 00     | rw | 0     | GPIO Bit 0           |

The embodiments described above of the integrated circuit with master mode and slave mode capability that includes a memory controller, a bus structure, a general purpose I/O circuit, and a peripheral port are illustrative only of the principles of this invention and are not intended to limit the invention to the particular embodiments described.

We claim:

1. A disk drive integrated circuit comprising:
   a program bus having a program address bus;
   a data bus having a data address bus;
   a common external memory bus;
   an internal common memory bus;
   a memory controller coupled to said program bus, said data bus, said common external memory bus, and said internal common memory bus; and
   a peripheral port coupled to said memory controller by said internal common memory bus
      wherein said peripheral port includes a master mode circuit and a slave mode circuit.

2. A disk drive integrated circuit as in claim 1 further comprising a general purpose input output circuit coupled to said memory controller by said internal common memory bus.

3. A disk drive integrated circuit as in claim 1 further comprising a plurality of external chip select lines connected to said memory controller wherein each external chip select line in said plurality is connected to said memory controller to receive an external chip select signal.

4. A disk drive integrated circuit as in claim 1 wherein said memory controller further comprises an address decoder circuit connected to said program address bus in said program bus, to said data address bus in said data bus, and to a plurality of external chip select lines
   wherein said program address bus and said data address bus provide input signals to said address decoder circuit; and
   said address decoder circuit selectively generates output signals on said plurality of external chip select lines.

5. A disk drive integrated circuit as in claim 4 wherein said memory controller further comprises a multiplexer circuit connected to said program address bus, to said data address bus, and to a common external memory address bus of said common external memory address bus, and having an input line connected to said address decoder circuit
   wherein when a signal on said input line has a first state, said multiplexer circuit passes information on said program address bus therethrough to said common external memory address bus; and
   when said signal on said input line has a second state, said multiplexer circuit passes information on said data address bus therethrough to said common external memory address bus.

6. A disk drive integrated circuit as in claim 1 wherein said master mode circuit further comprises:
   a first host interface data register connected to an internal common memory data bus in said internal common memory bus, and coupled to a bi-directional serial data line; and
   a second host interface data register connected to said internal common memory data bus in said internal common memory bus, and coupled to said bi-directional serial data line.

7. A disk drive integrated circuit as in claim 6 wherein said master mode circuit further comprises:
   a master mode state machine connected to a serial data enable line and to a serial clock line.

8. A disk drive integrated circuit as in claim 6 wherein said master mode circuit further comprises:
   a master mode serial interface control register connected to an internal common memory data bus in said internal common memory bus, and having a plurality of parameter lines.

9. A disk drive integrated circuit as in claim 8 wherein said master mode circuit further comprises:
   a master mode state machine connected to a serial data enable line, to a serial clock line, and to said plurality of parameter lines.

10. A disk drive integrated circuit as in claim 9 wherein said master mode circuit further comprises:
    a master mode transfer control register connected to said internal common memory data bus in said internal common memory bus, and having a read/write start line connected to said master mode state machine.

11. A disk drive integrated circuit as in claim 1 wherein said master mode circuit further comprises:
    a master mode serial interface control register connected to an internal common memory data bus in said internal common memory bus.

12. A disk drive integrated circuit as in claim 1 wherein said master mode circuit further comprises:
    a master mode state machine connected to a serial data enable line and to a serial clock line.

13. A disk drive integrated circuit as in claim 1 wherein said master mode circuit further comprises:
    a master mode transfer control register connected to an internal common memory data bus in said internal common memory bus.

14. A disk drive integrated circuit as in claim 1 wherein said slave mode circuit further comprises:
    a plurality of mailbox registers connected to an internal common memory data bus in said internal common memory bus and connected to a serial data line.

15. A disk drive integrated circuit as in claim 14 wherein said plurality of mailbox registers further comprises:
    a command register.

16. A disk drive integrated circuit as in claim 14 wherein said plurality of mailbox registers further comprises:
    a slave mode status register.

17. A disk drive integrated circuit as in claim 14 wherein said plurality of mailbox registers further comprises:
    a host interface data register.

18. A disk drive integrated circuit as in claim 1 wherein said slave mode circuit further comprises:
    a first host interface data register connected to an internal common memory data bus in said internal common memory bus, and connected to a bi-directional serial data line; and
    a second host interface data register connected to said internal common memory data bus in said internal common memory bus, and connected to said bi-directional serial data line.

19. A disk drive integrated circuit as in claim 18 wherein said slave mode circuit further comprises:

a command register connected to said internal common memory data bus in said internal common memory bus and to said bi-directional serial data line.

20. A disk drive integrated circuit as in claim 19 wherein said slave mode circuit further comprises:
a slave mode state machine connected to a serial data enable line, to said bi-directional serial data line, and to a serial clock line.

21. A disk drive integrated circuit as in claim 20 wherein said slave mode circuit further comprises:
a slave mode status register connected to said internal common memory data bus in said internal common memory bus and to said bidirectional serial data line.

22. A disk drive integrated circuit as in claim 20 wherein said slave mode circuit further comprises:
an address decoder connected to said slave mode state machine, and having a plurality of register select lines connected to said command register, to said slave mode status register, to said first host interface data register and to said second host interface data register.

23. A disk drive integrated circuit as in claim 1 wherein said slave mode circuit further comprises:
a command register connected to an internal common memory data bus in said internal common memory bus and to a bi-directional serial data line.

24. A disk drive integrated circuit as in claim 1 wherein said slave mode circuit further comprises:
a slave mode state machine connected to a serial data enable line, to a bi-directional serial data line, and to a serial clock line.

25. A disk drive integrated circuit as in claim 1 wherein said slave mode circuit further comprises:
a slave mode status register connected to an internal common memory data bus in said internal common memory bus and to a bi-directional serial data line.

26. A disk drive system comprising:
an integrated circuit comprising:
a processor program bus having a program address bus;
a processor data bus having a data address bus;
a common external memory bus;
an internal common memory bus;
a memory controller coupled to said program bus, said data bus, said common external memory bus, and said internal common memory bus;
a peripheral port coupled to said memory controller by said internal common memory bus
wherein said peripheral port includes a master mode circuit and a slave mode circuit; and
a general purpose input output circuit; and
a first memory external to said integrated circuit, and coupled to said common external memory bus.

27. A disk drive system as in claim 26 further comprising:
a second memory external to said integrated circuit, and coupled to said common external memory bus.

28. A disk drive system as in claim 27 wherein said second memory external to said integrated circuit is a read-only memory.

29. A disk drive system as in claim 27 wherein said second memory external to said integrated circuit is a random access memory.

30. A disk drive system as in claim 27 wherein said second memory external to said integrated circuit is a memory in a hard disk controller.

31. In a disk drive integrated circuit having master and slave capabilities, a peripheral port comprising:
a bi-directional serial data line;
a serial clock line;
a first host interface data register connected to said bi-directional serial data line;
a second host interface data register connected to said bi-directional serial data line;
a master mode state machine connected to said serial clock line;
a slave mode state machine connected to said serial clock line and to said bi-directional serial data line;
an address decoder connected to said slave mode state machine and to said first and second host interface data registers
wherein in a master mode, said bi-directional serial data line, said serial clock line said first and second host interface data registers, and said master mode state machine are utilized; and
in a slave mode, said bi-directional serial data line, said serial clock line, said first and second host interface data registers, said address decoder, and said slave mode state machine are utilized.

32. In a disk drive integrated circuit having master and slave capabilities as in claim 31 wherein said peripheral port further comprises:
a multiplexer circuit connected to said first host interface data register and to said second host interface data register, and coupled to said bi-directional serial data line, and having an input line connected to said master mode state machine wherein in response to a signal having a first state on said input line, said multiplexer circuit passes therethrough the information in the first host interface register; and in response to said signal having a second state on said input line, said multiplexer circuit passes therethrough the information in the second host interface register.

33. In a disk drive integrated circuit having master and slave capabilities as in claim 31 wherein said peripheral port further comprises:
a master mode serial interface control register having a plurality of parameter lines connected to said master mode state machine.

34. In a disk drive integrated circuit having master and slave capabilities as in claim 31 wherein said peripheral port further comprises:
a master mode transfer control register having a read/write start line connected to said master mode state machine.

35. In a disk drive integrated circuit having master and slave capabilities as in claim 31 wherein said peripheral port further comprises:
a slave mode status register connected to said bi-directional serial data line.

36. In a disk drive integrated circuit having master and slave capabilities as in claim 31 wherein said peripheral port further comprises:
a command register connected to said bidirectional serial data line.

* * * * *